US012607052B2

(12) United States Patent
Sunkara et al.

(10) Patent No.: US 12,607,052 B2
(45) Date of Patent: Apr. 21, 2026

(54) SEGMENTED CLOSURE SYSTEM

(71) Applicant: Re-U-Zip, LLC, Marina del Rey, CA (US)

(72) Inventors: Navaratan Kanna Sunkara, Marina del Rey, CA (US); Sivaketan Ramu Sunkara, Marina del Rey, CA (US)

(73) Assignee: Re-U-Zip, LLC, Marina del Rey, CA (US)

( * ) Notice: Subject to any disclaimer, the term of this patent is extended or adjusted under 35 U.S.C. 154(b) by 464 days.

(21) Appl. No.: 17/806,175

(22) Filed: Jun. 9, 2022

(65) Prior Publication Data

US 2023/0399881 A1 Dec. 14, 2023

(51) Int. Cl.
*E05C 19/16* (2006.01)

(52) U.S. Cl.
CPC .................................... *E05C 19/16* (2013.01)

(58) Field of Classification Search
CPC ........ A47H 23/00; A47H 23/02; A47H 23/04; A47H 2201/00; A47H 2201/01; A47H 2023/025; E05C 19/16; E04G 21/241; E04G 21/30
See application file for complete search history.

(56) References Cited

U.S. PATENT DOCUMENTS 2,014,752 A * 9/1935 Vesey ...................... A47H 5/02 160/349.2
2,500,074 A * 3/1950 Hill ........................ A47H 23/02 160/123
2,594,624 A * 4/1952 Dubinsky ............. A47H 23/02 160/124
(Continued)

FOREIGN PATENT DOCUMENTS

| | | |
|---|---|---|
| CN | 201101317 Y | 8/2008 |
| CN | 110617001 A | 12/2019 |
| KR | 10-20180130114 A | 12/2018 |

OTHER PUBLICATIONS

WIPO, U.S. International Search Authority, International Search Report and Written Opinion mailed Oct. 16, 2023 in International Patent Application No. PCT/US2023/068214, 10 pages.
(Continued)

*Primary Examiner* — Johnnie A. Shablack
(74) *Attorney, Agent, or Firm* — Inskeep IP Group, Inc.

(57) ABSTRACT

A segmented closure system for providing a closure strip of variable length capable of allowing the efficient opening and closing of an object to form a barrier such as a temporary door. The segmented closure system generally includes a pair of closure members each including a magnet for removably securing the closure members together. Each closure member includes a fastener for securing the each closure member to an object, such as to a pair of adjoining plastic sheets to form a temporary barrier such as a door. Each closure member may include mating connectors for linking the pair of closure members together end-to-end in a linear or angled orientation. Each closure member may include a pivotable segment connected to its main body by a connector pin. Temporary barriers of variable sizes may be easily constructed by interlinking multiple closure members together on opposite edges of a pair of plastic sheets.

13 Claims, 23 Drawing Sheets

(56) References Cited

U.S. PATENT DOCUMENTS

| | | | | |
|---|---|---|---|---|
| 2,609,043 | A * | 9/1952 | Dubinsky | A47H 23/04 160/390 |
| 2,768,922 | A | 10/1956 | Klein | |
| 3,276,512 | A * | 10/1966 | Gallagher | B60J 11/00 160/368.1 |
| 3,382,507 | A * | 5/1968 | Micheau | A47K 3/38 4/558 |
| 3,456,305 | A | 7/1969 | Voit | |
| 3,538,914 | A | 11/1970 | Myers | |
| 3,592,256 | A * | 7/1971 | Knight | A47H 23/02 160/184 |
| 3,632,154 | A * | 1/1972 | Woodrich | B60R 13/0823 237/28 |
| 3,685,103 | A | 8/1972 | Severino | |
| 3,696,472 | A | 10/1972 | Perina | |
| 3,785,014 | A | 1/1974 | Canepa | |
| 3,827,019 | A | 7/1974 | Serbu | |
| 3,883,381 | A | 5/1975 | Thaeler | |
| 3,925,858 | A | 12/1975 | Thaeler | |
| 4,083,582 | A | 4/1978 | Villafana | |
| 4,137,859 | A | 2/1979 | Itoh | |
| 4,151,682 | A | 5/1979 | Schmidt | |
| 4,242,767 | A * | 1/1981 | McMullen | A47D 13/00 5/640 |
| 4,582,109 | A | 4/1986 | Fairbanks | |
| 4,631,765 | A * | 12/1986 | Casey | A47G 9/0207 428/33 |
| 4,732,631 | A | 3/1988 | Shimizu | |
| 4,874,028 | A | 10/1989 | Lynch et al. | |
| 4,878,258 | A * | 11/1989 | Casey | A47G 9/0207 428/44 |
| 5,067,207 | A | 11/1991 | Semons | |
| 5,148,580 | A | 9/1992 | Dyckow | |
| 5,311,648 | A | 5/1994 | Semons | |
| 5,323,835 | A | 6/1994 | Bachmeier | |
| 5,368,085 | A | 11/1994 | Ruparelia | |
| 5,427,169 | A | 6/1995 | Saulters | |
| 5,429,404 | A * | 7/1995 | King, Sr. | E06B 3/80 160/DIG. 16 |
| 5,476,323 | A | 12/1995 | Gold | |
| 5,604,960 | A | 2/1997 | Good | |
| 5,680,893 | A | 10/1997 | Neer | |
| 5,738,159 | A * | 4/1998 | O'Brien | E06B 9/262 160/124 |
| 5,819,474 | A | 10/1998 | Strom | |
| 6,301,754 | B1 | 10/2001 | Grunberger et al. | |
| 7,154,363 | B2 | 12/2006 | Hunts | |
| 7,946,333 | B1 * | 5/2011 | Zapata | E06B 9/521 160/354 |
| 8,015,637 | B2 * | 9/2011 | Papen | A47D 15/003 5/482 |
| 8,578,570 | B1 | 11/2013 | Dwight | |
| 8,662,298 | B2 | 3/2014 | Aldana et al. | |
| 9,016,349 | B2 | 4/2015 | Seitz | |
| 9,113,739 | B2 * | 8/2015 | Thomas | A47H 2/00 |
| 9,387,921 | B1 | 7/2016 | Hogsette, Jr. et al. | |
| 9,591,898 | B2 * | 3/2017 | Burkhart-Day | E04H 15/32 |
| 9,890,584 | B1 * | 2/2018 | Chen | E04H 15/58 |
| 9,966,174 | B2 | 5/2018 | Naftali et al. | |
| 10,226,107 | B2 | 3/2019 | Burkhart-Day | |
| 10,905,203 | B2 | 2/2021 | Burkhart-Day et al. | |
| 11,598,146 | B2 * | 3/2023 | Conboy | E06B 9/386 |
| 2002/0000301 | A1 | 1/2002 | Rolin | |
| 2004/0011480 | A1 * | 1/2004 | Andre de la Porte | A47H 23/01 160/238 |
| 2005/0183247 | A1 | 8/2005 | Berns | |
| 2006/0139134 | A1 | 6/2006 | Hunts | |
| 2006/0283562 | A1 | 12/2006 | Hickey | |
| 2008/0017332 | A1 * | 1/2008 | Daly | A47H 23/04 160/330 |
| 2008/0040837 | A1 | 2/2008 | King | |
| 2008/0283202 | A1 * | 11/2008 | Serio, III | A47H 1/06 29/700 |
| 2009/0100648 | A1 | 4/2009 | Naftalin et al. | |
| 2009/0294075 | A1 * | 12/2009 | Huck | A63H 33/008 160/382 |
| 2010/0051210 | A1 * | 3/2010 | Daly | E06B 9/0692 160/113 |
| 2010/0051214 | A1 * | 3/2010 | Daly | A44B 19/262 160/368.1 |
| 2010/0107528 | A1 | 5/2010 | Toledo | |
| 2010/0186300 | A1 | 7/2010 | Trageser et al. | |
| 2010/0263122 | A1 * | 10/2010 | Papen | A47G 9/0207 5/482 |
| 2010/0269312 | A1 | 10/2010 | Wagner | |
| 2011/0068025 | A1 | 3/2011 | Whittemore | |
| 2011/0168340 | A1 * | 7/2011 | Squillante | A47H 2/00 160/368.1 |
| 2011/0192522 | A1 | 8/2011 | Whittemore | |
| 2012/0067531 | A1 * | 3/2012 | Ehrsam | H01F 7/0252 160/368.1 |
| 2012/0234705 | A1 | 9/2012 | Whittemore | |
| 2012/0261083 | A1 | 10/2012 | Daly | |
| 2013/0061431 | A1 | 3/2013 | Naftali et al. | |
| 2015/0216267 | A1 | 8/2015 | Burkhart-Day | |
| 2016/0375283 | A1 | 12/2016 | Lambridis | |
| 2017/0181506 | A1 | 6/2017 | Burkhart-Day | |
| 2018/0298686 | A1 | 10/2018 | Hearne | |
| 2019/0239675 | A1 | 8/2019 | Northey | |
| 2021/0047850 | A1 | 2/2021 | Whittemore | |
| 2021/0145132 | A1 * | 5/2021 | Burkhart-Day | F16B 1/00 |
| 2021/0404198 | A1 | 12/2021 | Whittemore | |
| 2022/0225813 | A1 | 7/2022 | Garfinkel | |
| 2023/0085227 | A1 * | 3/2023 | Xu | E04H 15/64 135/97 |
| 2023/0141115 | A1 * | 5/2023 | Hsiang | A63H 33/062 446/120 |
| 2023/0250691 | A1 * | 8/2023 | Riddle | E06B 9/521 160/349.1 |
| 2023/0399881 | A1 * | 12/2023 | Sunkara | E05C 19/16 |
| 2023/0399888 | A1 * | 12/2023 | Sunkara | E06B 5/025 |

OTHER PUBLICATIONS

ESB Flooring, How to Install Flooring Threshold Bars in 4 Simple Steps [online], <URL: https://esbflooring.com/blog/how-to-install-t-bar-door-threshold-in-4-simple-steps/>, ESB Flooring Sep. 23, 2021, 12 pages.

https://youtu.be/oF8v_uch3Ls; ZipWall Dust Barrier System—ZipWall MagStrips Installation YouTube Video Webpage; Jul. 31, 2018.

https://www.zipwall.com/product/magstrip-dust-barrier-fastener/#video; ZipWall MagStrip Dust Barrier Fastener Webpage.

https://www.zipwall.com/product/zipwall-magnetic-dust-barrier-door/; ZipWall Magnetic Dust Barrier Door Kit Webpage.

https://www.youtube.com/watch?v=1 pNK2PRa5g4; ProtecUK1 YouTube Video Webpage—How to Install the Zip Door Kit; May 22, 2015.

WIPO, U.S. International Search Authority, International Search Report and Written Opinion mailed Jun. 9, 2022 in International Patent Application No. PCT/US2020/020614, 34 pages.

United States Patent and Trademark Office, Office Action mailed Apr. 14, 2025 in U.S. Appl. No. 18/331,796, 23 pages.

* cited by examiner

SEGMENTED CLOSURE SYSTEM

FIELD OF THE INVENTION

Example embodiments in general relate to a segmented closure system for providing a closure strip of variable length capable of allowing the efficient opening and closing of an object such as a sheet to form a barrier such as a temporary door.

BACKGROUND OF THE INVENTION

Temporary barriers are widely used in a wide range of industries. As a prominent example, constructions sites often utilize temporary barriers to close off areas of construction. In such cases, plastic sheets have typically been hung or otherwise secured to an entrance/exit of an area to confine dust and other unfavorable debris to that particular area. Such plastic sheets have in the past been simply hung from an overhanging structure or taped to the sides of a structure, with the sheets being simple pushed or pulled out of the way when entering or exiting the area or have relied upon other connection means, e.g., peel-n-stick tarp zippers or the like.

While sheets secured in such a manner do provide limited utility, they suffer from a number of drawbacks. In many cases, such sheets are not properly secured, or the integrity of their connection can become compromised over time. Thus, such sheets have been known to fall off, become loose, or to not tightly seal when "closed", thus allowing such debris to escape the confined area. Further, standard zippers have been known to be left open, be susceptible to jamming or breaking, and/or cannot be easily replaced without replacement of the entire containment. Productivity can be lost by spending time either cleaning any escaped debris or having to repeatedly re-secure the sheet when it becomes compromised.

SUMMARY OF THE INVENTION

An example embodiment is directed to a segmented closure system. An example embodiment of the segmented closure system generally includes a pair of closure members each including a magnet for removably securing the closure members together. Each closure member includes a fastener for securing each closure member to an object, such as to a pair of adjoining plastic sheets to form a temporary barrier such as a door. Each closure member may include mating connectors for linking the pair of closure members together end-to-end in a linear or angled orientation. A linkage member may be connected between the pair of closure members to link the closure members side-to-side. Each closure member may include a pivotable segment connected to its main body by a connector pin. Buttons may link the segments, with pins holding the magnets in alignment and also acting as hinges for folding or rolling of the magnetic segments. Temporary barriers of variable sizes may be easily constructed by interlinking multiple closure members together on opposite edges of a pair of plastic sheets.

There has thus been outlined, rather broadly, some of the embodiments of the segmented closure system in order that the detailed description thereof may be better understood, and in order that the present contribution to the art may be better appreciated. There are additional embodiments of the segmented closure system that will be described hereinafter and that will form the subject matter of the claims appended hereto. In this respect, before explaining at least one embodiment of the segmented closure system in detail, it is to be understood that the segmented closure system is not limited in its application to the details of construction or to the arrangements of the components set forth in the following description or illustrated in the drawings. The segmented closure system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION

Figure 1:
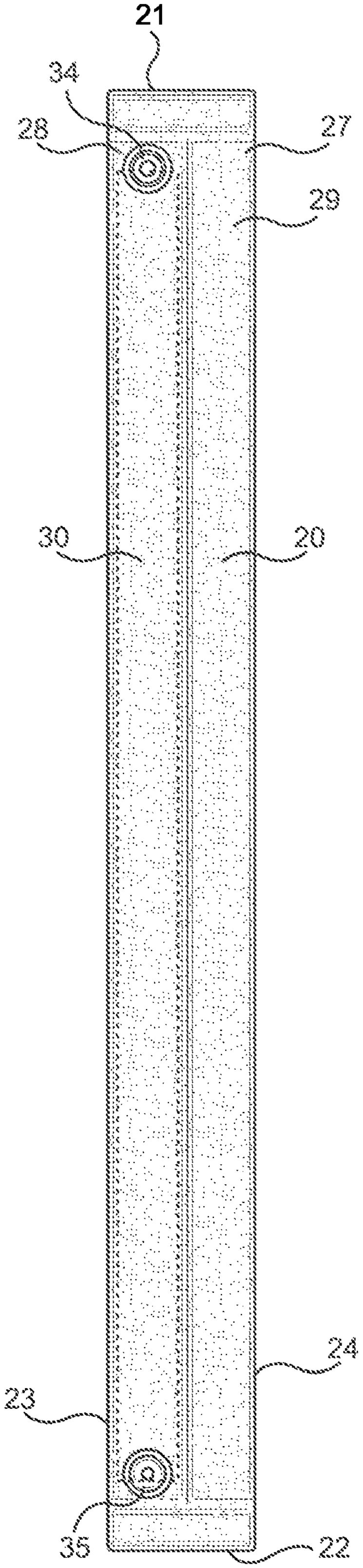
FIG. 1 is a frontal view of a closure member of a segmented closure system in accordance with an example embodiment.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

An example embodiment of the segmented closure system generally comprises a closure member 20 adapted to be removably secured to an object. The closure member 20 may be comprised of an elongated strip including an upper end 21, a lower end 22, a first side edge 23, a second side edge 24, an inner surface 26, and an outer surface 25. A magnet 30 may be connected at or near the first side edge 23 or the second side edge 24 of the closure member 20. A first mating connector 34 may be connected to the closure member 20. The closure member may include a fastener 32 for removably securing the closure member 20 to the object, with the fastener 32 being positioned on the inner surface of the closure member. The magnet 30 may be comprised of a magnetic strip and may extend between the upper and lower ends 21, 22 of the closure member 20. The magnet 30 may be connected within the closure member 20.

The fastener 32 may be comprised of a hook-and-loop fastener. The fastener 32 may be comprised of a strip of material, such as adhesive. The fastener 32 may extend between the upper and lower ends 21, 22 of the closure member 20. The first mating connector 34 may be comprised of a snap fastener, with a first side of the snap fastener being comprised of a male configuration and a second side of the snap fastener being comprised of a female configuration. A second mating connector 35 may be connected to the closure member 20, with the first mating connector 34 being connected at or near the upper end 21 of the closure member 20 and the second mating connector 35 being connected at or near the lower end 22 of the closure member 20. The first mating connector 34 may be comprised of a male configuration and the second mating connector 35 may be comprised of a female configuration.

The closure member 20 may include an upper segment 38 that is pivotably connected to an upper end of a main body of the closure member 20 by a first connector pin 42 and a lower segment 39 that is pivotably connected to a lower end of the main body of the closure member 20 by a second connector pin 43. A clamp 60 may be connected to the first side edge 23 or the second side edge 24 of the closure member 20.

Another exemplary embodiment may comprise a pair of closure members 20 each being adapted to be removably secured to an object. The first closure member 20 may include a first magnet 30 positioned along a first side edge 23 or a second side edge 24 of the first closure member 20 and includes a first fastener 32 for removably securing the first closure member 20 to the object. The first closure member 20 may include a first mating connector 35. The second closure member 20 may include a second magnet 30 positioned along a first side edge 23 or a second side edge 24 of the second closure member 20, a second fastener 32 for removably securing the second closure member 20 to the object, and a second mating connector 35. The first mating connector 34 of the first closure member 20 may be adapted to removably engage with the second mating connector 35 of the second closure member 20 so as to removably connect the first closure member 20 to the second closure member 20 in a linear orientation or an angular orientation. A linkage member 40 may be removably connected between an upper end 21 of the first closure member 20 and an upper end of the second closure member 20 so as to secure the first and second closure members 20 side-to-side.

Figure 2:
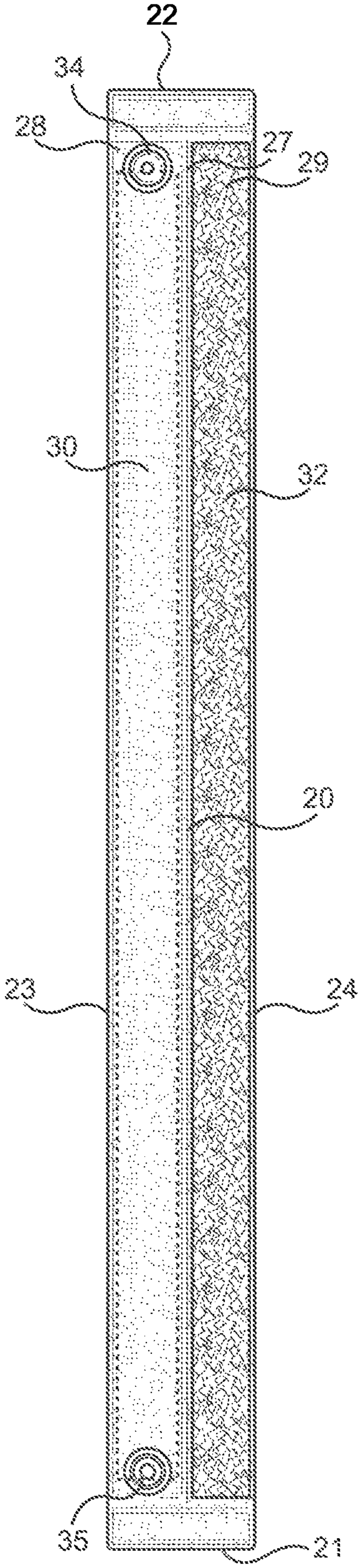
FIG. 2 is a rear view of a closure member of a segmented closure system in accordance with an example embodiment.

As best shown in FIGS. 1 and 2, the systems and methods described herein may utilize one or more closure members 20 which may be removably or fixedly connected to an object such as a sheet 12 (e.g., plastic sheeting) to form a wide range of different doors, closable openings, flaps, or barriers 18. Each such closure member 20 may be directly secured to the object, or may be secured to a backing member that is itself secured to the object. In embodiments in which the closure member(s) 20 are directly secured to the object, the magnet(s) 30 of the closure member(s) 20 may be utilized. As an example, the closure member 20 may be directly secured to a metallic door frame or the like using only the magnets 30 without the use of any backing member.

An example embodiment of a backing member used to connect a closure member 20 to an object such as a sheet 12 is shown and described in U.S. Pat. Nos. 9,591,898 and 10,905,203, the entire disclosures of which, except for any definitions, disclaimers, disavowals, and inconsistencies, are incorporated herein by reference.

As shown in FIGS. 1 and 2, each closure member 20 will generally comprise an elongated, rectangular strip having an upper end 21, a lower end 22, a first side edge 23, a second side edge 24, an outer surface 25, and an inner surface 26. The length, width, and overall dimensions of the closure member 20 may vary in different embodiments to suit different applications, and thus should not be construed as limited by the exemplary figures. In some embodiments, shorter (e.g., one foot or less in length) closure members 20 may be desirable, while in other embodiments, longer (e.g., greater than one foot in length) closure members 20 may be desirable.

Continuing to reference FIGS. 1 and 2, it can be seen that each closure member 20 is generally longer than it is wide (e.g., the distance between the upper and lower ends 21, 22 is greater than the distance between the first and second side edges 23, 24). However, it should be appreciated that, in some embodiments, each closure member 20 may be wider than it is long. It should also be appreciated that various shapes may be utilized, and thus the elongated, rectangular shape shown in the exemplary figures should not be construed as limiting in scope.

Figure 3:
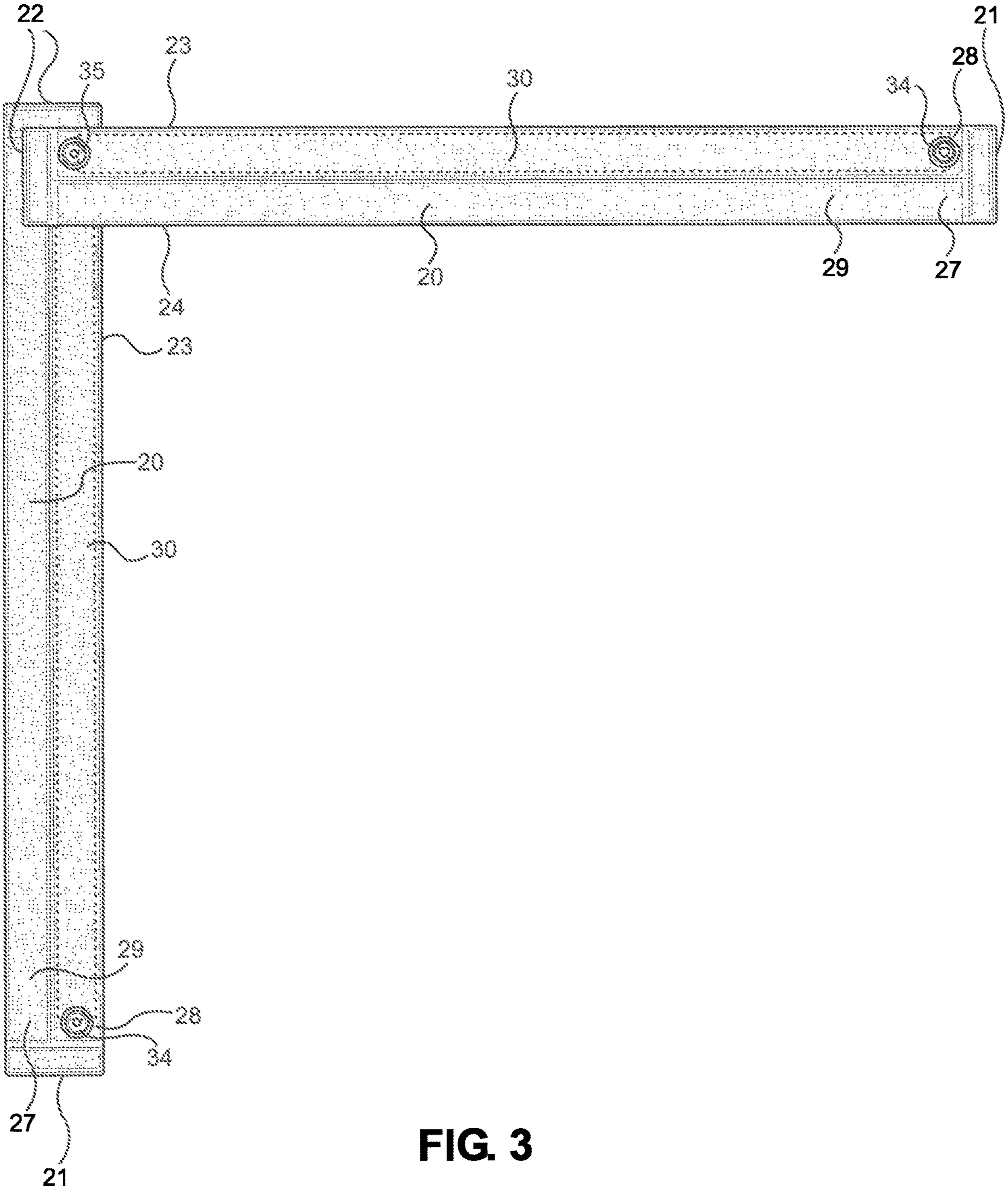
FIG. 3 is a frontal view of a pair of closure members interconnected at a right angle of a segmented closure system in accordance with an example embodiment.
Figure 4:
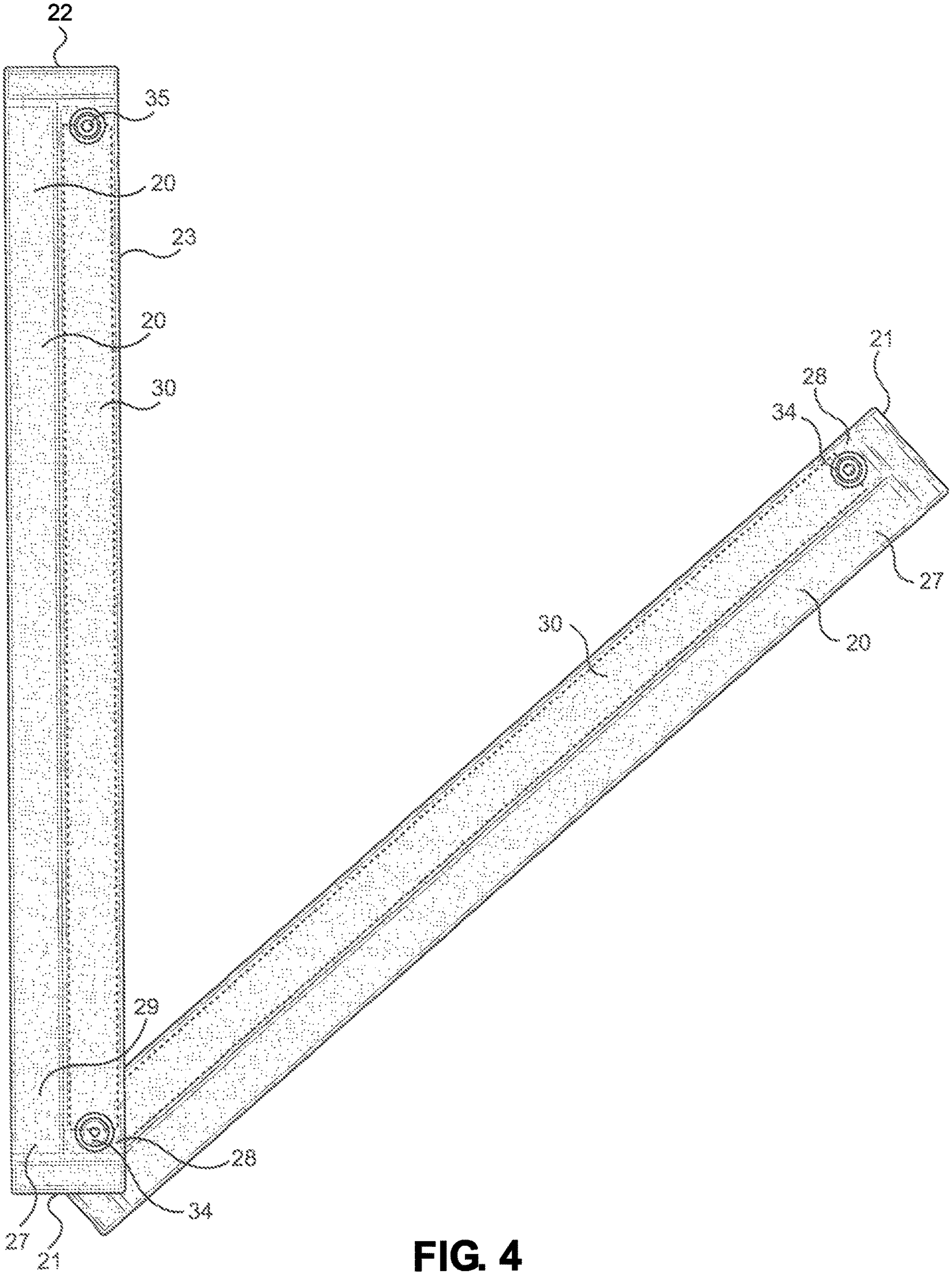
FIG. 4 is a frontal view of a pair of closure members interconnected at an acute angle of a segmented closure system in accordance with an example embodiment.
Figure 7:
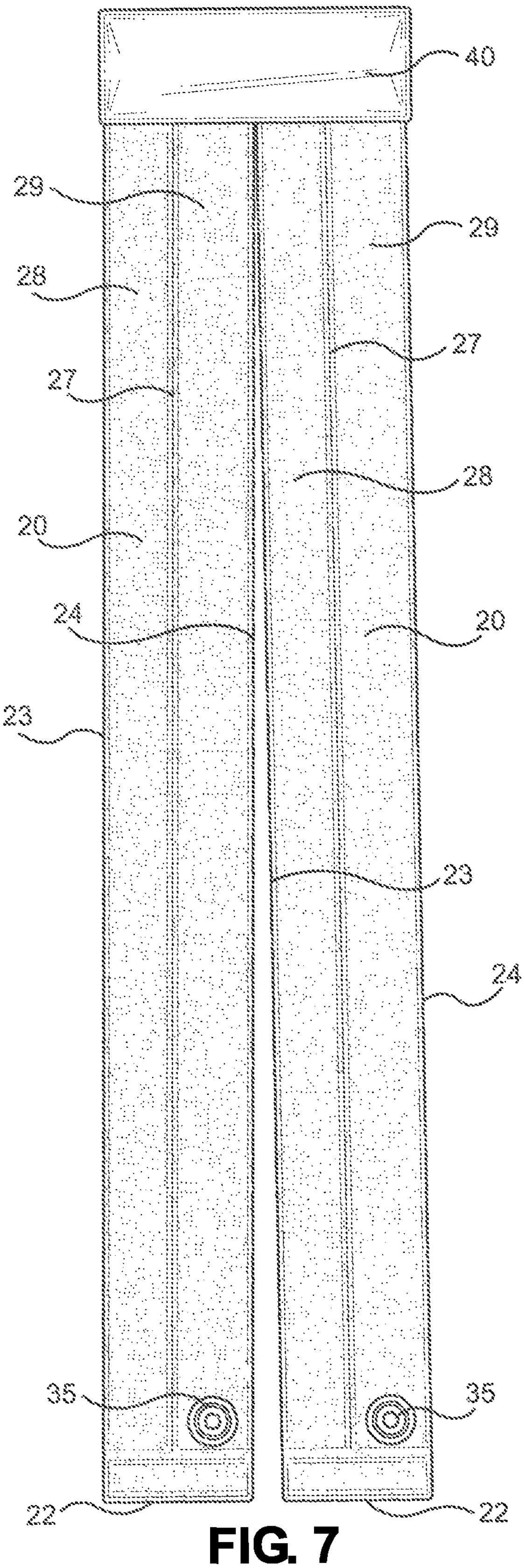
FIG. 7 is a frontal view of a pair of closure members being secured side-to-side at their respective upper ends of a segmented closure system in accordance with an example embodiment.
Figure 8:
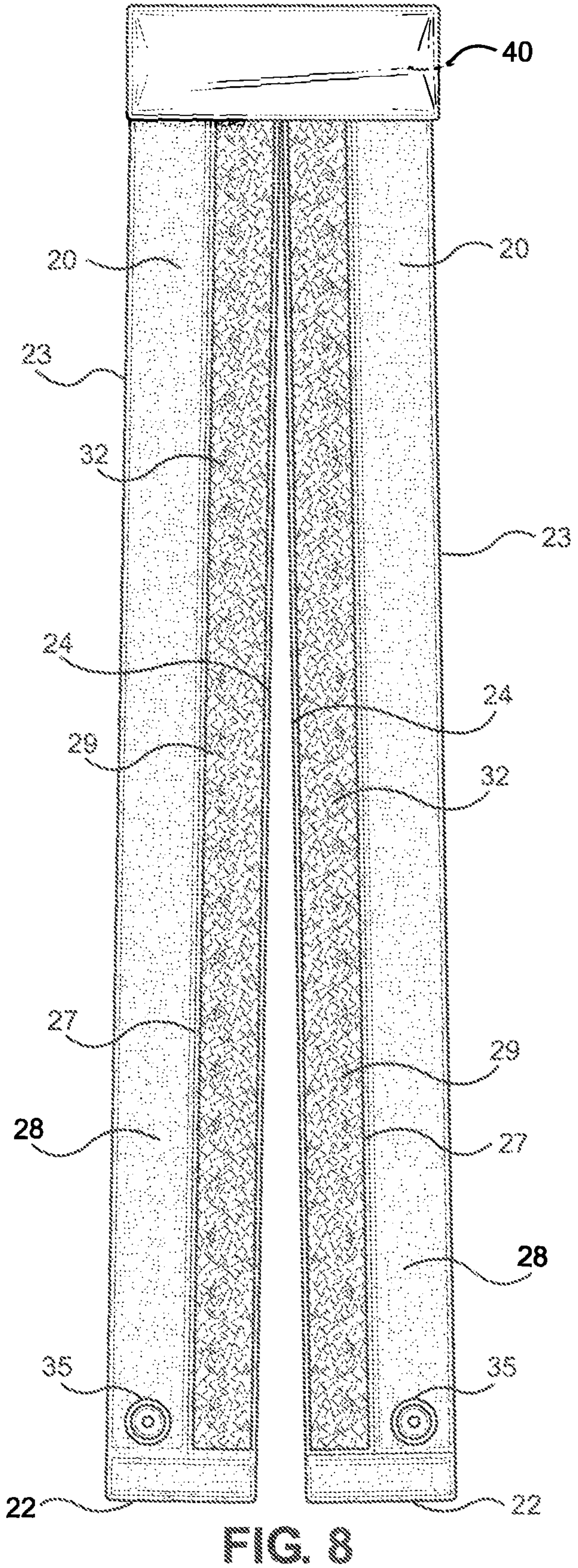
FIG. 8 is a rear view of a pair of closure members being secured side-to-side at their respective upper ends of a segmented closure system in accordance with an example embodiment.

As discussed herein, the closure members 20 may be adapted to be interconnected together in a removable manner to form elongated strips of two or more closure members 20 in a daisy-chain configuration. When multiple closure members 20 are so interconnected, they may be connected linearly such as shown in FIGS. 10A-13B, at various angles as shown in FIGS. 3 and 4, or side-to-side as shown in FIGS. 7 and 8. By interconnecting multiple closure members 20 together, the length of the overall elongated strip formed by the multiple closure members 20 may be of variable length to suit various applications.

With reference to FIGS. 1 and 2, it can be seen that each closure member 20 may be split between a first segment 28 and a second segment 29, with the pair of segments 28, 29 being divided by a divider 27. The first segment 28 may comprise a first half of the width of the closure member 20 and the second segment 29 may comprise a second half of the width of the closure member 20. Thus, the first segment 28 may extend along the first side edge 23 of the closure member 20 and the second segment 29 may extend along the second side edge 24 of the closure member 20.

One or both of the segments 28, 29 may include an interior pocket in which one or more magnets 30 may be secured as discussed herein. The divider 27 may comprise stitching or the like to separate the pair of segments 28, 29 such as shown in FIG. 1. The positioning of the divider 27 along the width of the closure member 20 may vary. In the exemplary embodiment shown in the figures, the divider 27 splits the width of the closure member 20 evenly, with the first and second segments 28, 29 each comprising the same width. However, in some embodiments, the divider 27 may instead be positioned such that the first segment 28 is wider than the second segment 29, or vice versa.

It should be appreciated that, in some embodiments, one or more of the magnets 30 may be removable. By way of example, in embodiments in which one or more magnets 30 are secured within a pocket, the pocket may function as a sleeve so as to be accessible to remove and interchange magnets 30 as needed. Such an embodiment allows for a user to interchange stronger or weaker magnets depending on the application for which the closure member 20 is being used.

As best shown in FIGS. 1-4, each closure member 20 may include one or more magnets 30 which allow each closure member 20 to be removably connected to a corresponding adjacent closure member 20 so as to form a barrier that may easily be opened or closed. By way of example, a pair of adjacent closure members 20 may each include a magnet 30 such that, when drawn close together, the pair of adjacent closure members 20 are magnetically-attracted to each other into a closed state. With minimal application of force, the adjacent closure members 20 may be drawn away from each other such that the magnets 30 disengage into an opened state. When connected to sheets 12 to form a barrier such as shown in FIGS. 10A-13B, releasing the sheets 12 may automatically revert the closure members 20 towards each other to magnetically engage back into the closed state as discussed in more detail herein.

The types of magnets 30 utilized may vary in different embodiments. In the embodiment shown in the figures, it can be seen that each magnet 30 may be comprised of a unitary magnetic strip that extends between the upper and lower ends 21, 22 of each closure member 20. In some embodiments, however, multiple magnetics 30 may be positioned linearly to extend along the first and/or second side edges 23, 24 of the closure members 20. In yet other embodiments, where a magnetic strip is utilized, the magnetic strip may be segmented to allow the closure member 20 to be bent or curved. In yet other embodiments, the magnetic strip may be flexible for the same purpose.

In some embodiments, the magnets 30 may additionally or alternatively comprise weights. Thus, magnets 30 having varying weights may be utilized and, as described above, interchanged in some embodiments. Use of weights in addition to or instead of magnets 30 may provide benefits when closure members 20 are being used as a threshold as discussed herein to increase the ability of a barrier's ability to hold air pressure. In embodiments in which weights are used instead of magnets 30, the weights may comprise various weighted materials such as but not limited to metal bars or a sandbag.

As shown in FIGS. 1-4, each closure member 20 may include one or more magnets 30 positioned at or near its first side edge 23 and/or second side edge 24. The magnets 30 may extend fully along the length of the closure member 20 (e.g., between the upper and lower ends 21, 22 thereof), or may extend for only a portion of the length of the closure member 20. While the figures illustrate an exemplary embodiment in which one or more magnets 30 extend only along one side edge 23, 24 of the closure member 20, it should be appreciated that, in some embodiments, both side edges 23, 24 of the closure member 20 may include its own magnet 30.

The positioning, shape, and orientation of the magnets 30 may vary in different embodiments. Generally, one or more magnets 30 will extend for substantially the full length between the upper and lower ends 21, 22 of each closure member 20 along its first side edge 23. However, in some embodiments, the magnets 30 may instead (or additionally) extend along the second side edge 24 of the closure member 20.

The polarity and/or positioning of the magnets 30 may vary across different closure members 20. For example, in a pair of closure members 20 meant to be removably connected together each having magnets 30 on their respective first side edges 23, the magnet 30 on the first side edge 23 of the first closure member 20 may have a first polarity and the magnet 30 on the first side edge 23 of the second closure member 20 may have a second, opposite polarity such that the magnets 30 attract each other.

In some embodiments, each closure member 20 may have a first magnet 30 having a first polarity extending along its first side edge 23 and a second magnet 30 having a second polarity extending along its second side edge 24. In yet another embodiment, a single magnet 30 may be utilized, with a first side of the magnet 30 having a first polarity extending along the first side edge 23 of the closure member 20 and a second side of the magnet 30 having a second, opposite polarity extending along the second side edge 24 of the closure member 20.

Figure 6:
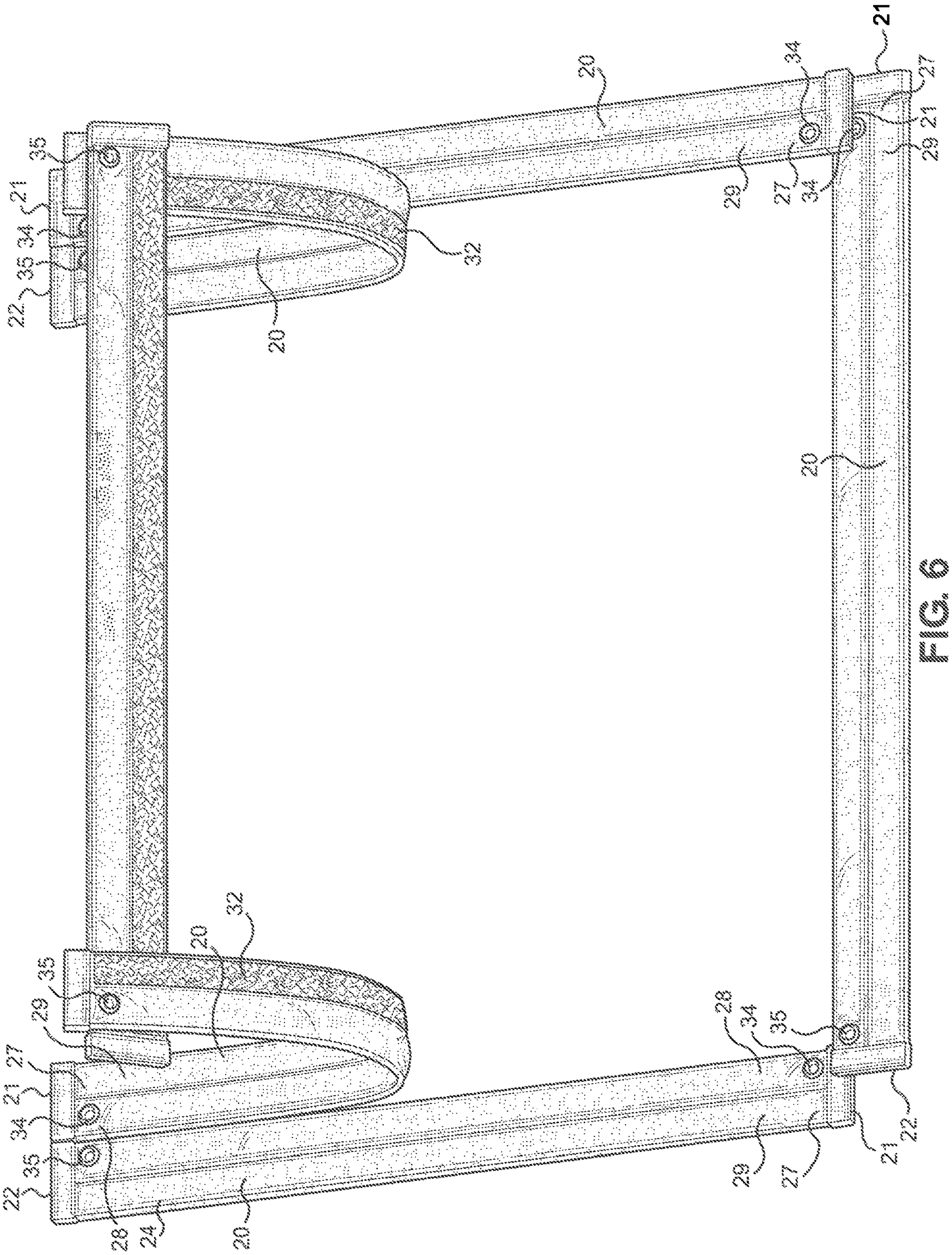
FIG. 6 is a frontal view of a plurality of closure members interconnected to form a barrier in an opened position of a segmented closure system in accordance with an example embodiment.

As best shown in FIGS. 2, 6, and 8, each closure member 20 may include a fastener 32 for securing (fixedly or removably) the closure member 20 to an object such as the edge of a plastic sheet 12. Various fasteners 32 may be utilized for securing the closure member 20 to an object, such as but not limited to adhesives, fasteners (e.g., hook-and-loop fasteners, nails, pins, and the like), tape, magnets, or various other materials or devices known in the art to secure one object to another.

The manner by which the closure member 20 is secured to an object may vary in different embodiments. The closure member 20 may be directly secured to the object. In such embodiments, the fastener 32 may comprise an adhesive such as an adhesive layer of glue, resin, or other materials known to have adhesive properties. A temporary sheet of non-adhesive material may be positioned over the fastener 32. Alternatively or in addition, the closure member 20 may be taped, fastened (e.g., by nails, pins, or the like), or otherwise secured directly to the object.

As an example, in one embodiment, a closure member 20 may be secured to a mesh (e.g., to a screen door) through use of a pin extending through both the closure member 20 and the mesh. As a further embodiment for securing the closure member 20 to a mesh, pins 42 as described herein may be used to secure a pair of closure members 20 to each other, with the mesh being sandwiched between the pair of closure members 20.

In other embodiments, the fastener 32 may comprise one or more magnets as discussed in more detail herein. Such embodiments may be useful for securing the closure member 20 to various magnetically-receptive objects such as metallic door frames and the like without the need for a separate backing member, adhesive, or other securing components. In such embodiments, the one or more magnets may be external (e.g., secured to a surface of the closure member 20) or may be internal (e.g., secured in a pocket or the like within the closure member 20).

The closure member 20 may also be indirectly secured to the object, such as by the use of one or more backing members as shown and described in U.S. Pat. Nos. 9,591,898 and 10,905,203, the entire disclosures of which, except for any definitions, disclaimers, disavowals, and inconsistencies, have been previously incorporated herein by reference. As an example, the backing member may comprise tape such as double-sided tape. In such embodiments, the closure member 20 may not have a fastener 32, but instead rely upon the fastening properties inherent in the backing member.

In the exemplary embodiment best shown in FIGS. 2, 6, and 8, the closure member 20 is illustrated as including a fastener 32 on its inner surface 26 (i.e., the surface of the closure member 20 which is secured to the object). In some embodiments, the closure member 20 also include a fastener 32 on its outer surface 26 so as to secure various other objects or devices, such as another closure member 20, to the outer surface 26 of the closure member 20.

Continuing to reference FIGS. 2, 6, and 8, it can be seen that the fastener 32 may comprise an elongated strip of a hook-and-loop fastener (e.g., Velcro). While the figures illustrate a single, continuous, elongated strip of fastener 32, it should be appreciated that the fastener 32 may comprise various other shapes and configurations. As a non-limiting example, the closure member 20 could instead comprise multiple fastener 32 tabs positioned at its corners. As a further non-limiting example, the closure member 20 could comprise a first fastener 32 positioned at or near its upper end 21 and a second fastener 32 positioned at or near its lower end 22.

In the figures, an embodiment is shown in which the fastener 32 extends along the second segment 29 of the inner surface 26 of the closure member 20. More specifically, it can be seen in FIG. 2 that an exemplary embodiment may include a fastener 32 which extends along the second side edge 24 of the inner surface 26 of the closure member 20 between the upper and lower ends 21, 22 of the closure member 20.

As previously mentioned, it should be appreciated that, in some embodiments, the fastener 32 may not extend fully between the upper and lower ends 21, 22 of the closure member 20. In some embodiments, the fastener 32 may instead be positioned along the first segment 28 of the inner surface 26 of the closure member 20 (e.g., along the first side edge 23). In other embodiments, the fastener 32 may cover the entirety of the inner surface 26 of the closure member 20 (e.g., both the first and second segments 28, 29 of the closure member 20).

The fastener 32 of the closure member 20 will generally engage either with the object itself or with a backing member which is itself secured to the object. In the embodiment shown in the figures, the backing member may include an outward-facing strip of hook-and-loop fastener adapted to engage with the corresponding fastener 32 on the inner surface 26 of the closure member 20. In other embodiments, the object may itself have a strip of hook-and-loop fastener to which the fastener 32 of the closure member 20 may engage. As previously mentioned, various other methods may be utilized to secure the closure member 20 to the object, such as but not limited to the use of tape (either single-sided tape applied to cross both the closure member 20 and the object or double-sided tape applied between the object and the inner surface 26 of the closure member 20).

Figure 16A:
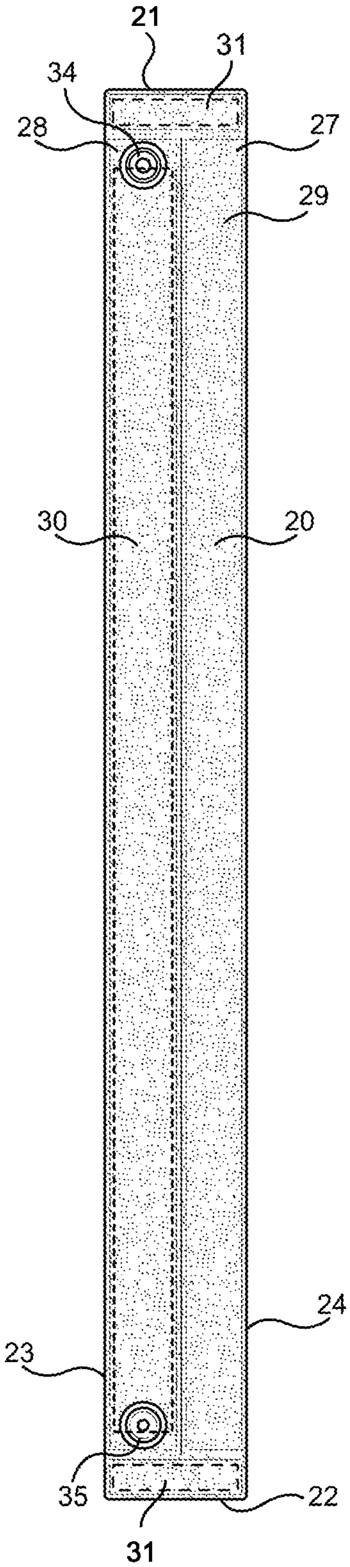
FIG. 16A is a frontal view of a closure member of a segmented closure system in accordance with an example embodiment.
Figure 16B:
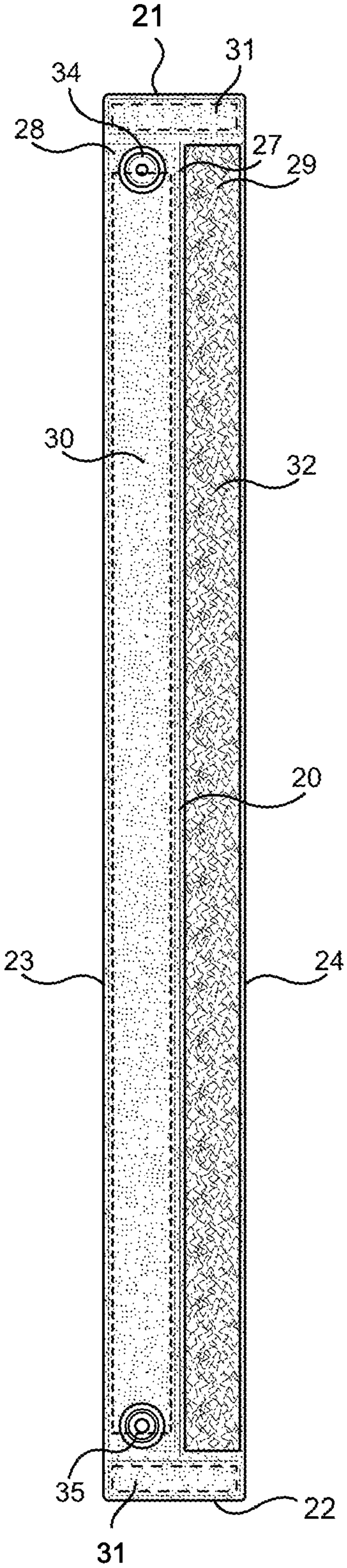
FIG. 16B is a rear view of a closure member of a segmented closure system in accordance with an example embodiment.

FIGS. 16A and 16B illustrate an example embodiment in which the closure member 20 includes additional magnets 31 positioned at its upper and lower ends 21, 22. Such upper and lower magnets 31 may be utilized for interconnecting multiple closure members 20 to each other linearly or in other orientations. The upper and lower magnets 31 may also in some embodiments aid in securing the closure member 20 to various objects such as metallic frames and the like.

Continuing to reference FIGS. 16A and 16B, each of the upper and lower magnets 31 may be oriented perpendicularly with respect to the magnet 30 extending between the upper and lower ends 21, 22 of the closure member 20. The upper and lower magnets 31 may be positioned internally to the closure member 20, or may be secured to either its front or rear faces. In embodiments in which the upper and lower magnets 31 are internal, they may be positioned within pockets formed at or near the respective upper and lower ends 21, 22 of the closure member 20. In some embodiments, the closure member 20 may include only an upper magnet 31 or only a lower magnet 31.

Figure 17A:
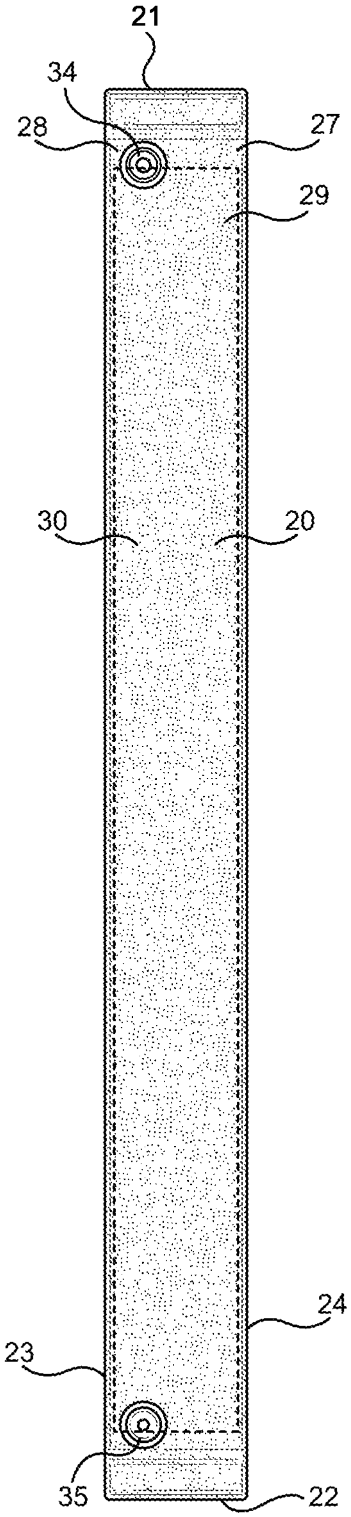
FIG. 17A is a frontal view of a closure member of a segmented closure system in accordance with an example embodiment.

FIG. 17A illustrates an example embodiment in which a magnet 30 internal to the closure member 20 is substantially the same width as the closure member 20 itself. In such an embodiment, the magnet 30 may be sized so as to cover the entire width between the first and second side edges 23, 24 of the closure member 20 such as shown in FIG. 17A.

Figure 17B:
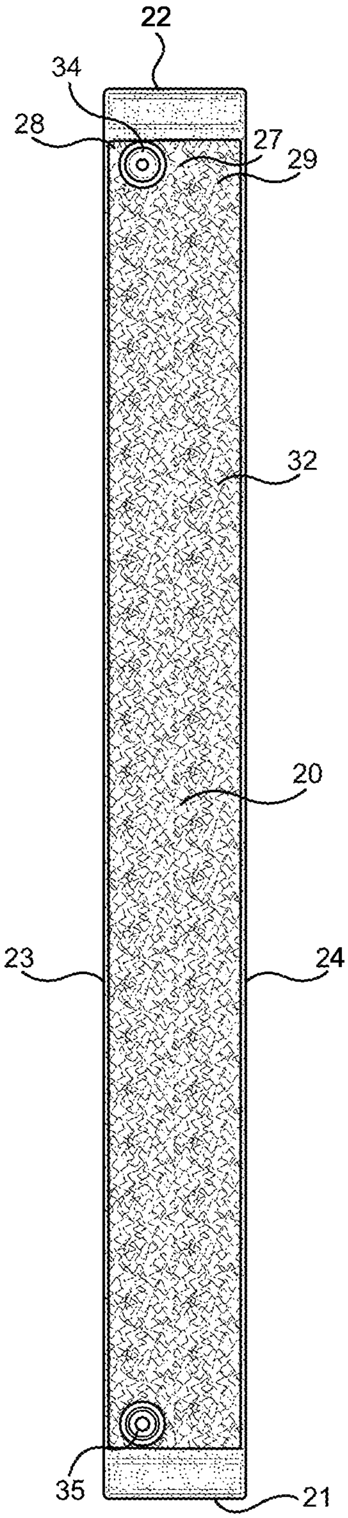
FIG. 17B is a rear view of a closure member of a segmented closure system in accordance with an example embodiment.

FIG. 17B illustrates an embodiment in which the fastener 32 is substantially the same width as the closure member 20 itself. In such an embodiment, the fastener 32 may be sized so as to cover the entire width between the first and second edges 23, 24 of the closure member 20 such as shown in FIG. 17B, the fastener 32 may thus cover an entire face of the closure member 20. In some embodiments, both faces of the closure member 20 may be covered by the fastener 32. In other embodiments, only one of the faces (e.g., the front face or the rear face) of the closure member 20 may be covered by the fastener 32.

Figure 18:
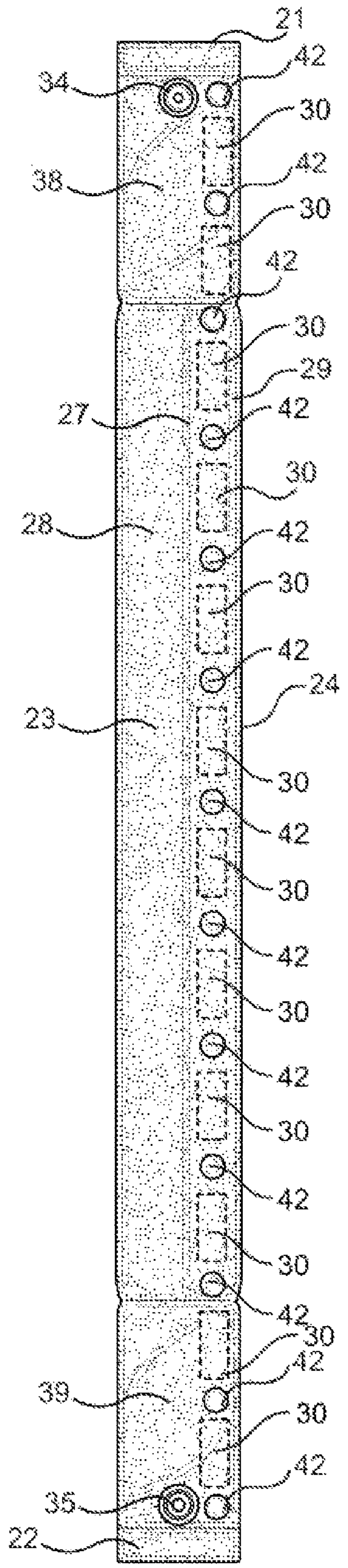
FIG. 18 is a frontal view of a closure member of a segmented closure system in accordance with an example embodiment.

FIG. 18 illustrates an embodiment in which multiple, segmented magnets 30 may be utilized. Such a configuration allows for bending, folding, rolling, or other manipulation of the closure member 20 as may be needed either for use or for storage/transport. As shown in FIG. 18, each of the segmented magnets 30 may be separated by a pin 42 which prevents the magnets 30 from clumping together, (maintain alignment with opposing magnetic segments) and allows for manipulation of the orientation of various segments of the length of the closure member 20. It should be appreciated that the number of segmented magnets 30 extending between the respective upper and lower ends 21, 22 of the closure member 20 should not be construed as limited by the example embodiment of the drawings. Further, the size of each such segmented magnet 30 may also vary in different embodiments.

Figure 21:
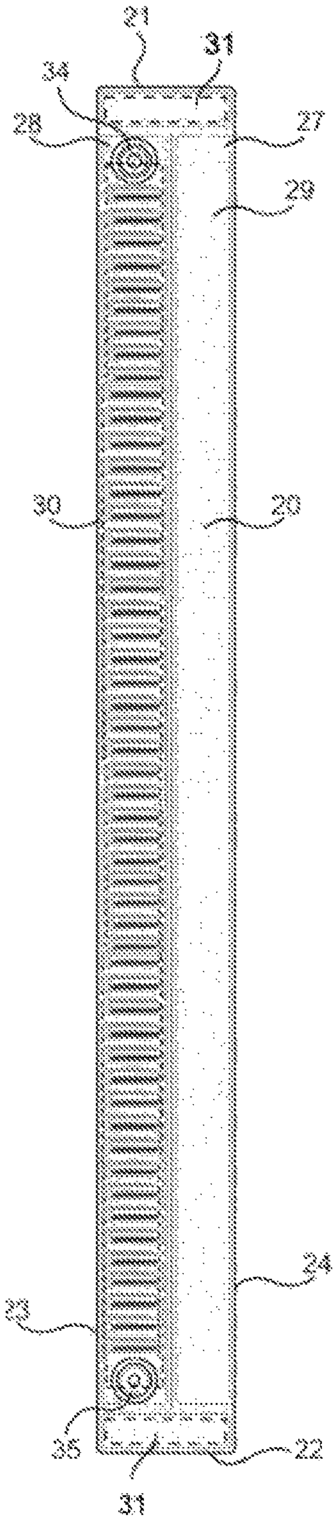
FIG. 21 is a frontal view of a closure member of a segmented closure system in accordance with an example embodiment.

FIG. 21 illustrates another embodiment in which multiple, segmented magnets 30 may be utilized to allow for bending, folding, rolling, or other manipulation of the closure member 20 as may be needed either for use or for storage/transport. As shown in FIG. 21, each of the segmented magnets 30 may comprise a cylindrical magnet. The cylindrical magnets 30 may be arranged linearly between the upper and lower ends 21, 22 of the closure member 20. The cylindrical magnets 30 may be rotatably connected to each other, such as by the use of pins, brackets, clamps, or the like, or may be disconnected from each other. In some embodiments, the cylindrical magnets 30 may be linked by magnetic attraction. The cylindrical magnets 30 may each be positioned within separate pockets or may be separated by a pin 42 similar to the embodiment shown in FIG. 18. In such embodiments using cylindrical magnets 30, the closure member 20 may be self-adhering such that the closure member 20 may be rolled up (e.g., a rolled up door configuration) without the need for any separate component for maintaining (holding in place) the barrier and closure members 20 in the rolled up configuration.

The number, size, shape, and configuration of such magnets 30 may vary in different embodiments and thus should not be construed as limited by the example embodiment of FIG. 21. For example, an example embodiment may utilize bead-shaped magnets 30 arranged linearly between the upper and lower ends 21, 22 of the closure member 20.

Figure 19:
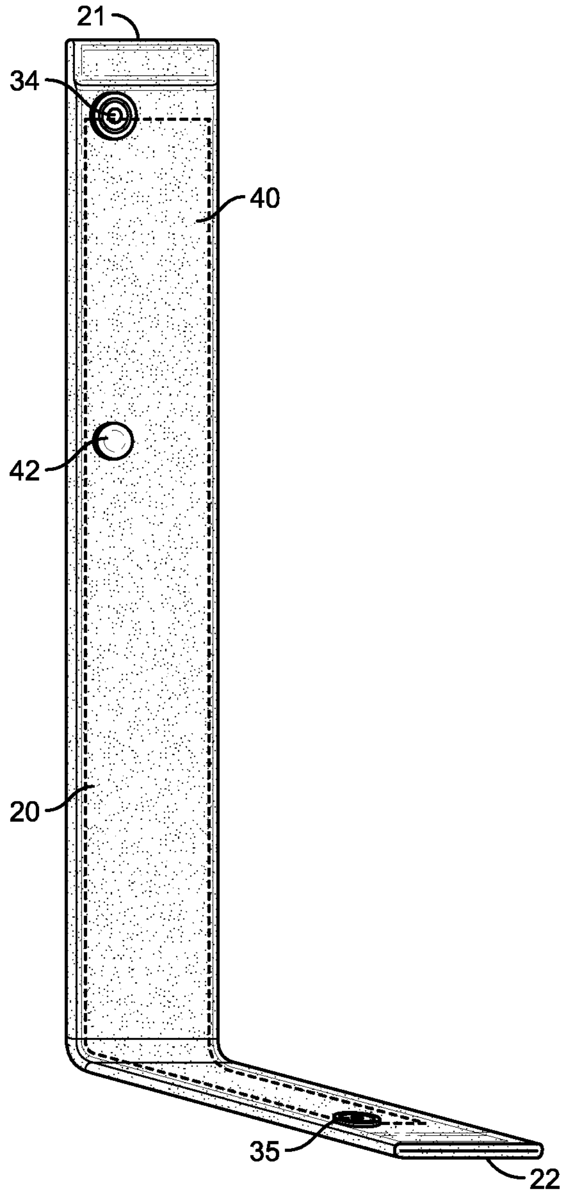
FIG. 19 is a perspective view of a closure member being bent at a right angle in accordance with an example embodiment.

FIG. 19 illustrates an example embodiment of a closure member 20 which has been bent at a right angle, such as to extend from covering a wall to covering a floor. Such an orientation may be made possible by use of the segmented magnets 30 previously discussed with respect to FIGS. 18 and 21, or various other methods. For example, in some embodiments, a single magnet 30 which is itself bendable or otherwise manipulatable may be utilized. As an example, the magnet 30 may comprise multiple spherical or cylindrical magnets that are formed together within the closure member 20 to allow the closure member 20 to be bent, folded, or rolled up as needed for different uses or storage/transport, e.g., as a framework to roll up barrier sheeting.

As best shown in FIGS. 1-9, each closure member 20 may include one or more mating connectors 34, 35 which may be utilized to connect multiple closure members 20 together in various angles, including but not limited to linearly, right angles, obtuse angles, and acute angles, for various purposes. As discussed herein, the positioning, orientation, number, and type of mating connectors 34, 35 utilized with each closure member 20 may vary in different embodiments, and thus should not be construed as limited by the exemplary embodiments shown in the figures.

As shown in FIGS. 1 and 2, an exemplary embodiment of a closure member 20 may include a pair of mating connectors 34, 35 which are each adapted to removably mate with a corresponding mating connector 34, 35 on an adjacent, connected closure member 20. While the figures illustrate that each closure member 20 includes a pair of mating connectors 34, 35 comprised of an upper mating connector 34 and a lower mating connector 35, it should be appreciated that more or less mating connectors 34, 35 may be utilized on each closure member 20 in different embodiments.

Continuing to reference FIGS. 1 and 2, it can be seen that an exemplary embodiment of a closure member 20 may comprise an upper mating connector 34 positioned at or near the upper end 21 of the closure member 20 and a lower mating connector 35 positioned at or near the lower end 22 of the closure member 20. However, the positioning of the mating connectors 34, 35 may vary in different embodiments. For example, a mating connector 34 could additionally or alternatively be positioned centrally between the upper and lower ends 21, 22 of the closure member 20.

The figures illustrate that the mating connectors 34, 35 may be positioned on the first segment 28 of the closure member 20 near its first side edge 23. However, the mating connectors 34, 35 may instead or additionally be positioned on the second segment 29 of the closure member 20 near its second side edge 24. In some embodiments, the mating connectors 34, 35 may be positioned centrally between the side edges 23, 24 of the closure member 20, such as along the divider 27.

Various types of mating connectors 34, 35 may be utilized for interconnecting multiple closure members 20 together such as shown in FIGS. 3 and 4. In one exemplary embodiment as shown in the figures, each of the mating connectors 34, 35 may comprise male snap fasteners or female snap fasteners. In some embodiments, each mating connector 34, 35 may comprise a male portion on one side (e.g., the outer surface 25 side) and a female portion on the other side (e.g., the inner surface 26 side). The figures illustrate generic mating connectors 34, 35 to reflect that any illustrated mating connectors 34, 35 could be male or female depending upon the embodiment.

While the figures illustrate the use of mating connectors 34, 35 comprised of snap fasteners, it should be appreciated that various other types of mating connectors 34, 35 may be utilized. By way of example and without limitation, the mating connectors 34, 35 could comprise buttons, riveted fasteners, shank buttons, sew-through buttons, stud buttons, clasps, clamps, or any other type of fastening connector known for use with mating engagement.

Generally, each closure member 20 will include at least one mating connector 34, 35 which is adapted to matingly and removably engage with a corresponding mating connector 34, 35 on an adjacent closure member 20. This allows multiple closure members 20 to be linked or connected together at various angles to allow for variable lengths and different configurations.

Figure 5:
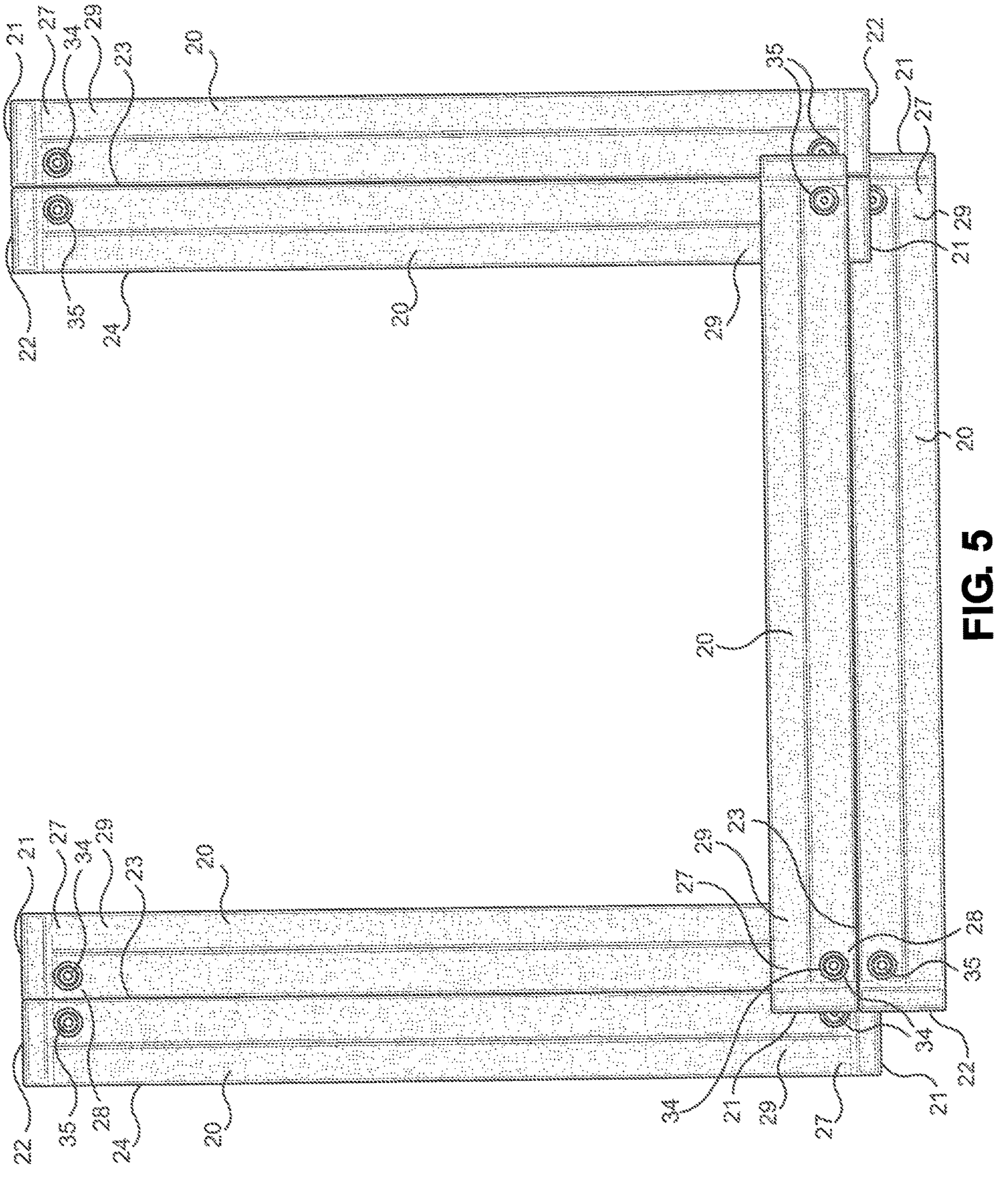
FIG. 5 is a frontal view of a plurality of closure members interconnected to form a barrier in a closed position of a segmented closure system in accordance with an example embodiment.

FIG. 3 illustrates a pair of closure members 20 being linked together at a right angle, with the respective lower mating connectors 35 of each closure member 20 being matingly engaged with each other. FIG. 4 illustrates a pair of closure members 20 being linked together at an acute angle, with the upper mating connector 34 of the first closure member 20 being matingly engaged with the lower mating connector 35 of the second closure member 20. FIGS. 5 and 6 illustrate multiple closure members 20 being interconnected by function of both magnets 30 and mating connectors 34, 35 to form a "doggy door" configuration. These are merely exemplary configurations and embodiments for illustrative purposes, and should not be construed as limiting in scope, as multiple other configurations may be utilized for a wide range of functions.

As shown in FIGS. 7 and 8, a linkage member 40 may be utilized to link a pair of closure members 20 together side-by-side without requiring that the magnets 30 of each closure member 20 be positioned adjacent to each other for magnetic engagement. The linkage member 40 allows for a pair of closure members 20 to be linked together side-by-side without regard for the positioning of the magnets 30. The linkage member also allows for the pair of linked-together closure members 20 to be oriented at various angles, such as parallel as shown in FIG. 7 or angled as shown in FIG. 8.

The linkage member 40 may also be utilized in combination with the magnets to link together a pair of closure members 20 such that the closure members 20 are still connected together at their upper and/or lower ends 21, 22 even when in the opened state. For example, a linkage member 40 may be positioned to link a pair of closure members 20 together at both their upper and lower ends 21, 22 such that, when the magnets 30 of each closure member 20 are disengaged to open the closure members the closure members 20 remain linked together at their upper and lower ends 21, 22 while still allowing for a space to be opened between the closure members 20. In this manner, a pair of sheets 12 may be connected together such that an opening may be formed between the sheets 12 while the sheets 12 are still connected together.

As shown in FIGS. 7 and 8, the linkage member 40 may comprise a rectangular member which is sized to cover both the upper ends 21 or the lower ends 22 of a pair of adjacent, side-by-side closure members 20. The linkage member 40 may comprise a flexible or a rigid material. The linkage member 40 may include hook-and-loop fastener on its interior so as to engage with the fasteners 32 of the closure members 20 to which it is connected.

The linkage member 40 may be secured over both closure members 20 by various other manners, such as but not limited to fasteners, clasps, clamps, tape, and the like. In some embodiments, the linkage member 40 may include a pair of snap fasteners on its interior which are adapted to matingly engage with the corresponding mating connectors 34, 35 on the pair of closure members 20. In such embodiments, a first snap connector of the linkage member 40 would engage with a mating connector 34, 35 of the first closure member 20 and a second snap connector of the linkage member 40 would engage with the mating connector 34, 35 of the second closure member 20, thus linking the pair of closure members 20 together.

Continuing to reference FIGS. 7 and 8, it can be seen that the width of the linkage member 40 may be approximately equal to the combined width of the pair of closure members 20. It should be appreciated, however, that in some embodiments, the width of the linkage member 40 may be greater than or less than the combined width of a pair of closure members 20. In some embodiments, the linkage member 40 may be of sufficient width to interconnect more than two closure members 20 in a side-to-side configuration (e.g., the linkage member 40 may be of sufficient width to interconnect three or more closure members 20).

Figure 9:
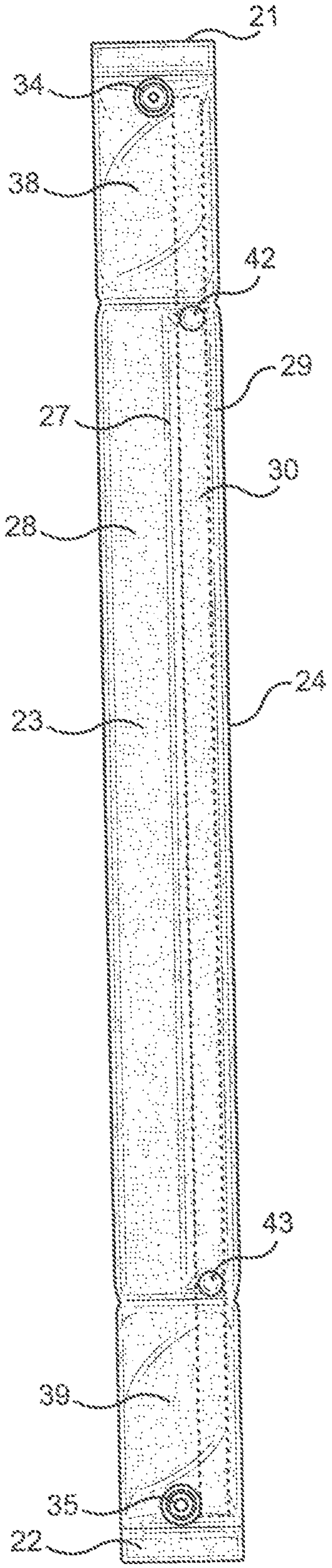
FIG. 9 is a frontal view of a closure member including pivotable end portions of a segmented closure system in accordance with an example embodiment.

In some embodiments such as shown in FIG. 9, the closure member 20 may include portions of its body which can be pivoted with respect to the main body of the closure member 20. In the exemplary embodiment shown in FIG. 9, it can be seen that the closure member 20 includes a discrete upper segment 38 at its upper end 21 and a discrete lower segment 39 at its lower end 22. In this manner, the upper and/or lower segments 38, 39 may be pivoted angularly with respect to the main body of the closure member 20.

As shown in FIG. 9, each of the upper and lower segments 38, 39 may be pivotably connected to the main body of the closure member 20 by a connector pin 42, 43. In the illustrated embodiment, the upper segment 38 is pivotably connected to the main body of the closure member 20 by a first connector pin 42 and the lower segment 39 is pivotably connected to the main body of the closure member 20 by a second connector pin 43.

Each connector pin 42, 43 creates a flex point in the body of the closure member 20 such that the upper and/or lower segments 38, 39 may be pivoted or flexed with respect to the main body of the closure member 20. Thus, the upper segment 38 may be pivotably connected to the main body of the closure member 20 by a first connector pin 42 and the lower segment 39 may be pivotably connected to the main body of the closure member 20 by a second connector pin 43 such as shown in FIG. 9.

The use of such connector pins 42 (e.g., spacer pins vs. segment connector snap buttons) may function as hinging points for perfect alignment that allows for self-adherence of the closure members 20 such that a magnetic flap door configuration (or other configurations) can be held at the desired point of height and not to only one single fully opened position (e.g., halfway up) without the need for extra materials such as hooks, tapes, or the like to secure the flap in an opened position.

In some embodiments utilizing upper and lower segments 38, 39, the magnet 30 may extend through the upper and lower segments 38, 39 in addition to the main body of the closure member 20. In such embodiments, the magnet 30 may be flexible or segmented to allow for pivotable movement. In other embodiments, the magnet 30 may terminate at the upper and lower segments 38, 39, and thus extend only through the main body of the closure member 20. In yet other embodiments, separate magnets 30 may be utilized (e.g., neo-d magnets) in each of the upper and lower segments 38, 39 of the closure member 20.

Figure 14:
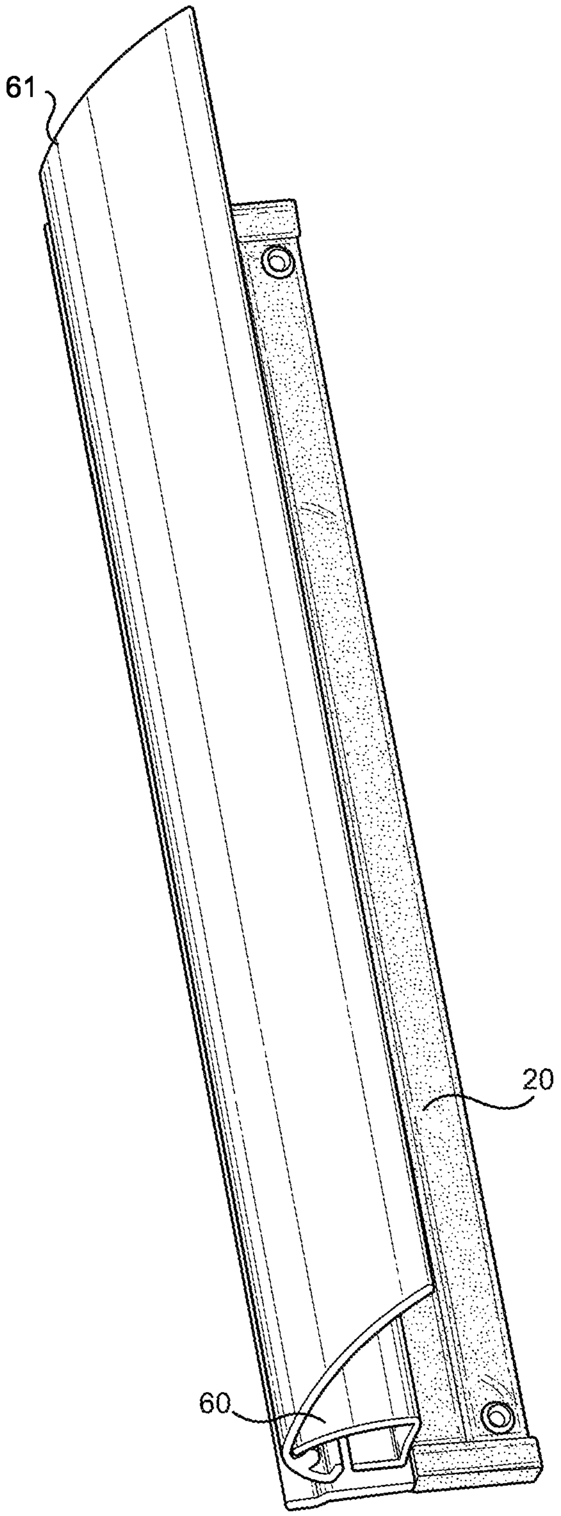
FIG. 14 is a perspective view of a clamping closure member of a segmented closure system in accordance with a first example embodiment.

In some embodiments, the closure member 20 may include a clamp 60 connected to its first or second side edge 23, 24 for clamping to various objects, such as but not limited to rigid poly materials such as acrylic glass, plexiglass, or the like and flexible materials such as plastic sheets 12, paper sheets, cardboard, fabric, or any other type of barrier edge. FIG. 14 illustrates a first exemplary clamp 60 which includes a handle 61 allowing for the clamp 60 to be released. In the embodiment shown in FIGS. 14, a clamp 60 is shown as being connected to the first and/or second side edges 23, 24 of a closure member 20 such that the closure member 20 may be secured against the edge of various barrier-forming objects.

Figure 15:
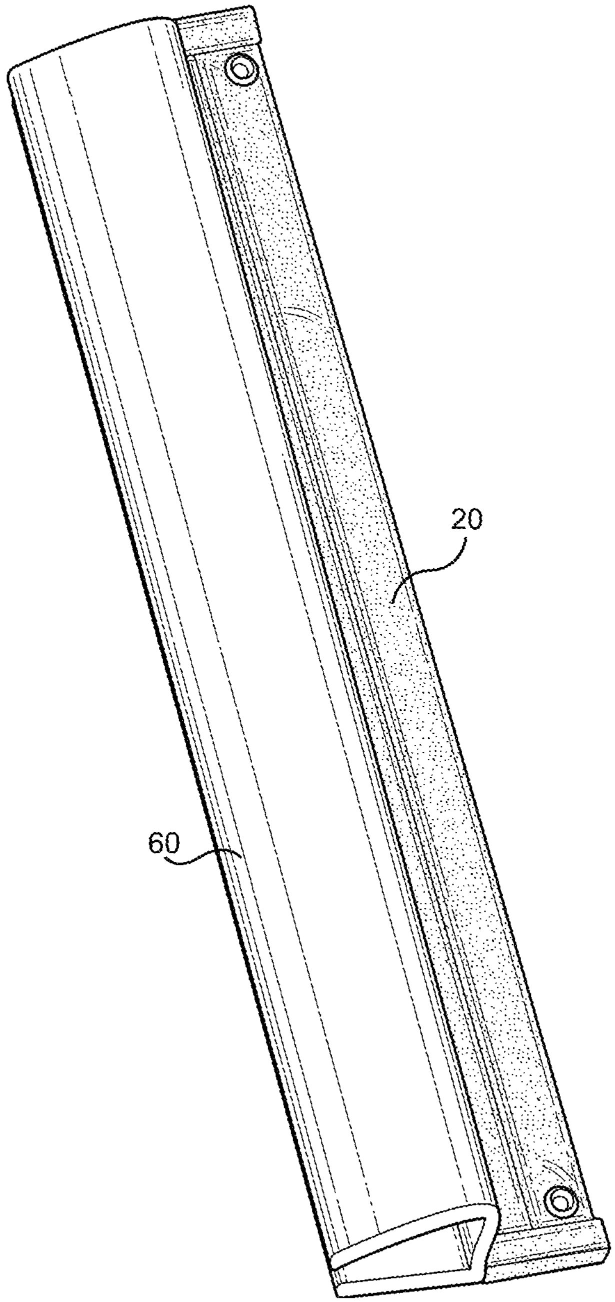
FIG. 15 is a perspective view of a clamping closure member of a segmented closure system in accordance with a second example embodiment.

FIG. 15 illustrates a second exemplary clamp 60 which does not include a handle 61. Such an embodiment may simply be slid on and slid off the edge of a rigid object. As shown in FIG. 15, a clamp 60 may be connected to the first and/or second side edges 23, 24 of a closure member 20 such that the closure member 20 may be secured against the edge of various barrier-forming objects.

In additional embodiments, a clamp 60 may be connected to a simple magnet 30 rather than a closure member 20. In any of the foregoing embodiments, the clamp 60 need only be secured to the edge of a barrier-forming material (e.g., rigid or flexible materials which are being used to form a temporary or permanent barrier). In such embodiments, a separate backing member or adhesive, tape, or the like may be omitted, with the closure member 20 instead being secured directly to the barrier-forming material by the clamp 60, which pinches the edge of the barrier-forming material to secure the closure member 20 thereto.

As shown in FIGS. 10A-12, the closure members 20 may be utilized in connection with connector strips 50 and/or adhesive strips 16 such as tape to form various objects such as barriers 18 such as doors or the like. Such connector strips 50 and/or adhesive strips 16 may include zippers, magnets, and/or adhesives and will generally be cut-to-size, rather than interconnected in the same manner as the closure members 20.

Exemplary embodiments of connector strips 50 that may be utilized in combination with the closure members 20 described herein are shown and described in U.S. Pat. Nos. 9,591,898 and 10,905,203, the entire disclosures of which, except for any definitions, disclaimers, disavowals, and inconsistencies, have been previously incorporated herein by reference.

The systems and methods described herein and shown in the figures may be utilized for a wide range of applications and functions. Closure members 20 as shown and described herein may be utilized to connect a wide range of objects and devices, such as but not limited to blinds, curtains, purses, tents, greenhouses, garments, purses, backpacks, walls, entryways, barriers, packages, boxes, containers, and the like. The closure members 20 disclosed herein may be utilized on fabric-based objects, such as but not limited to tents, greenhouses, refrigeration curtain strips, and the like. The ability to form a perpendicular angle with closure members 20 permits the sealing of the bottom portion of a "T-cut" dust barrier in a self-sealing manner.

By way of example, multiple closure members 20 may be interconnected together to allow the easy opening and closing of an opening formed within any of the aforementioned objects and devices. Broadly speaking, a first closure member 20 may be secured on the first side of an opening and a second closure member 20 may be secured on the second side of an opening, with the first magnet 30 of the first closure member 20 facing towards the second magnet 30 of the second closure member 20. The manner by which the closure members 20 are secured on either side of the opening of the object or device may vary in different embodiments, including but not limited to the use of fasteners 32, clamps 60, tape, adhesives, backing members, and the like.

With the first closure member 20 secured to a first side of the opening and the second closure member 20 secured to a second side of the opening, the opening may be closed by positioning the first and second closure members 20 towards each other until their respective magnets 30 engage with each other. The opening will thus be closed and sealed. When desired, one of both sides of the opening may be grasped and pulled open, at which point the magnets 30 will disengage to expose the opening. Upon release, the two sides of the opening may automatically revert to their original position at which the two closure members 20 re-engage if the two sides of the opening comprise a resilient material such as plastic sheets 12. Alternatively, the two sides of the opening may be manually drawn back together at which point the two closure members 20 will re-engage with each other.

Multiple closure members 20 may be interconnected together so as to allow a variable length to be determined at the time of installation, and to allow for non-linear configurations. To link multiple closure members 20 end-to-end as shown in FIGS. 3 and 4, one or more of the mating connectors 34, 35 of a first closure member 20 may be matingly engaged with one or more mating connectors 34, 35 of a second, adjacent closure member 20.

When the mating connectors 34, 35 are comprised of snap fasteners as shown in the figures, the closure members 20 may then be pivoted with respect to each other to form various different angles. FIG. 3 illustrates a pair of closure members 20 interconnected at a right angle. FIG. 4 illustrates a pair of closure members 20 interconnected at an acute angle. It should be appreciated that any angle may be supported, and thus the exemplary figures should not be construed as limiting.

Multiple closure members 20 may be interconnected together to form a "flap" that may be easily opened and closed, such as for use as a doggy-door. As shown in FIG. 5, two pairs of vertical closure members 20 may be positioned in a spaced-apart relationship, with the distance between the two pairs of vertical closure members 20 defining the width of the opening. More specifically, a first outer closure member 20 may be secured to a structure, such as an edge of a wall or the like, on the first side of an opening. A second outer closure member 20 may be secured to a structure on the second side of the opening. A first lower closure member 20 may be secured to a ground surface underlying the opening.

Continuing to reference FIG. 5, a first inner closure member 20 may be secured to a first side of a temporary barrier, such as a plastic sheet 12. A second inner closure member 20 may be secured to a second side of the same temporary barrier, with the first inner closure member 20 being positioned adjacent to the first outer closure member 20 and the second inner closure member 20 being positioned adjacent to the second outer closure member 20. A second lower closure member 20 may be secured between the first and second inner closure members 20, such as by use of the mating connectors 34, 35.

Thus, the first and second outer closure members 20 and the first lower closure member 20 are each anchored on either side and below the opening. The first and second inner closure members 20 are magnetically and releasably engaged with the first and second outer closure members 20, and the first lower closure member 20 is magnetically and releasably engaged with the second lower closure member 20. In this manner, a flap may be created that may be selectively opened such as shown in FIG. 6. Upon releasing the flap, the flap will automatically revert to the closed position, with the closure members 20 automatically magnetically engaging with each other.

As shown in FIGS. 7 and 8, multiple closure members 20 may be interconnected side-to-side by use of a linkage member 40. The linkage member 40 may be secured across either the upper ends 21 or the lower ends 22 of the adjacent closure members 20. The closure members 20 may be pivoted to various angles with respect to each other as-needed for various purposes, such as to form a V-shaped configuration.

Figure 10A:
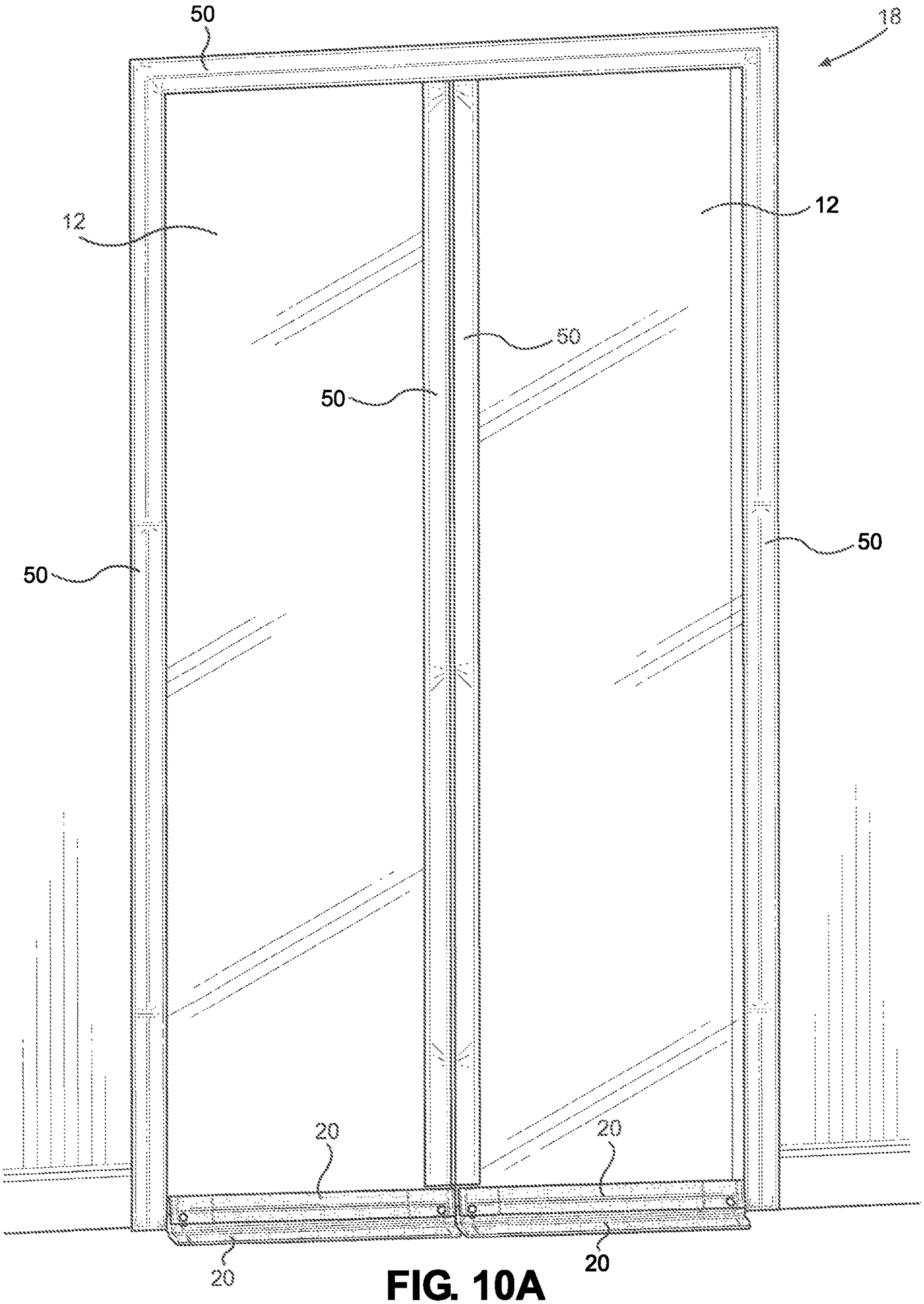
FIG. 10A is a perspective view of a temporary door with a threshold formed by a plurality of closure members of a segmented closure system in accordance with an example embodiment.
Figure 10B:
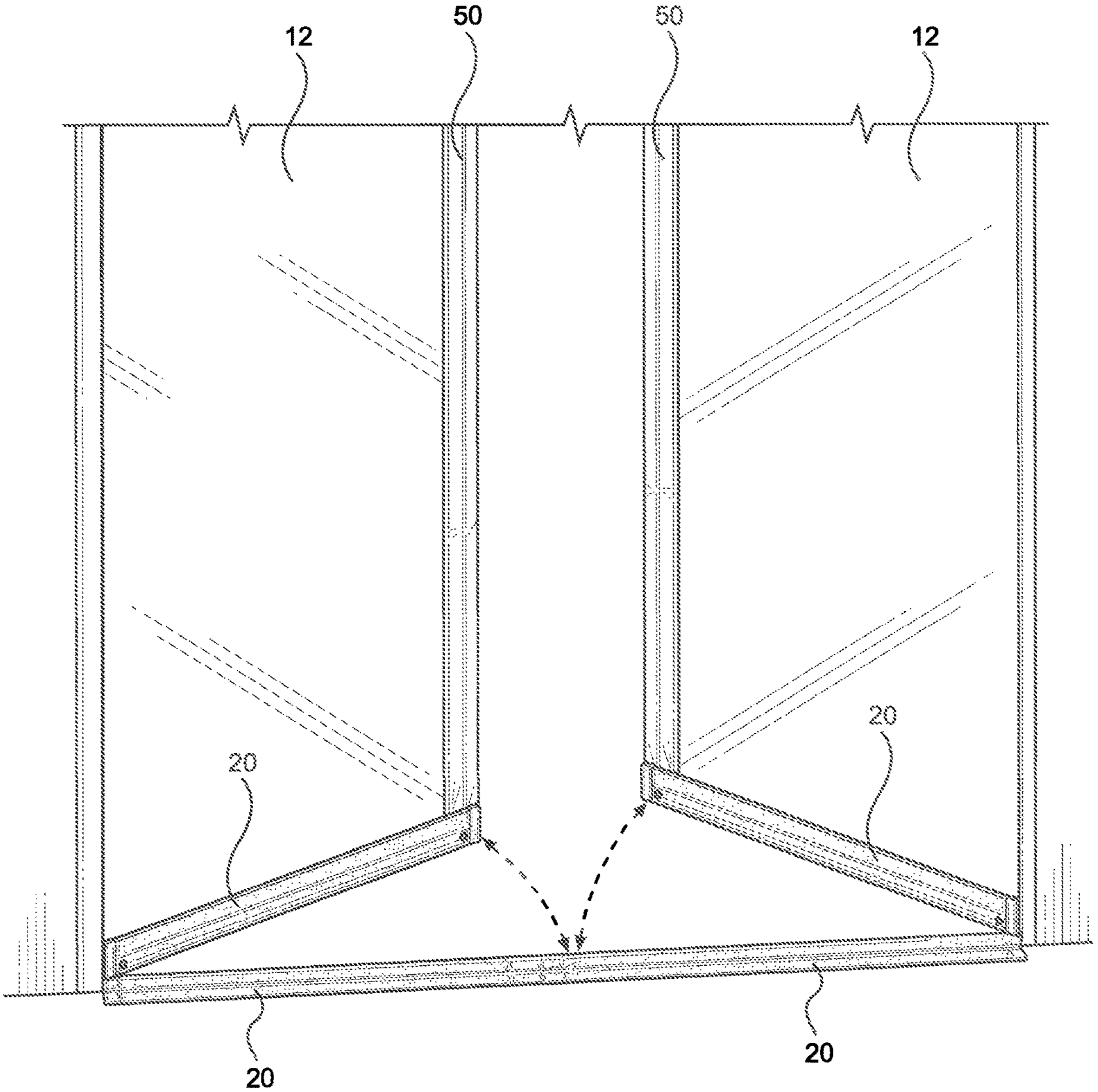
FIG. 10B is a perspective view of a temporary door with a threshold formed by a plurality of closure members in an opened position of a segmented closure system in accordance with an example embodiment.

FIGS. 10A and 10B illustrate the use of closure members 20 and/or connector strips 50 to form a simple barrier having a lower magnetic threshold. A pair of rectangular plastic sheets 12 are secured at their outer edges to a structure such as a wall on either side of an opening, such as by connector strips 50 or closure members 20. A pair of closure members 20 are linked together and secured to the floor underlying the opening to form a magnetic threshold. An additional pair of closure members 20 are secured to the lower end of the two sheets so as to engage with the magnetic threshold. In other embodiments, such a pair of closure members 20 may be connected to a T-metal plate on the floor which functions as a threshold.

FIG. 10A illustrates such a temporary barrier in a closed position. The sheets 12 may be pushed open to expose an opening that may be passed through such as shown in FIG. 10B. Upon releasing the sheets 12, the barrier will automatically close, with the magnetic threshold securing the barrier in a closed position in a sealed manner.

Figure 11:
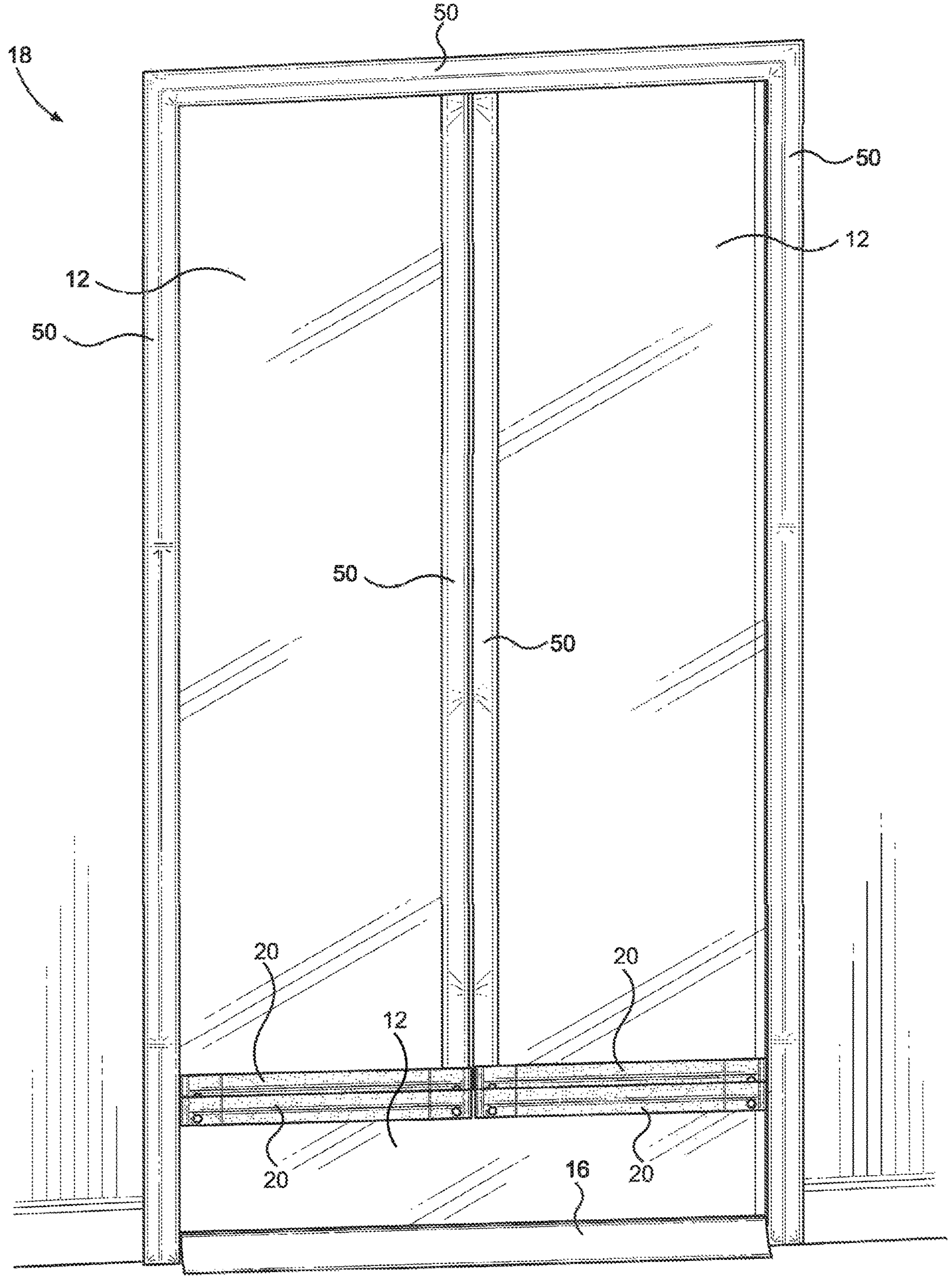
FIG. 11 is a perspective view of a temporary door with a raised threshold formed by a plurality of closure members of a segmented closure system in accordance with an example embodiment.

FIG. 11 illustrates an alternative configuration which includes a raised magnetic threshold such that there is a self-sealing threshold between the floor and the lower end of the barrier. Such a configuration, which includes a solid barrier formed of plastic sheet 12 (or other barrier-forming materials), ensures that the bottom region below the barrier is sealed (e.g., to maintain a water/dust barrier) while workers or other individuals have access through the barrier by stepping over the self-sealing threshold, which is formed by a rectangular plastic sheet 12 surrounding by closure members 20. As shown in FIG. 11, a lower threshold has been formed by a combination of adhesive strips 16 (e.g., a strip of tape) and closure members 20, with the adhesive strips 16 securing the bottom of the threshold to the floor, and the closure members 20 securing the top of the threshold to the plastic sheets 12 forming the barrier.

Figure 12:
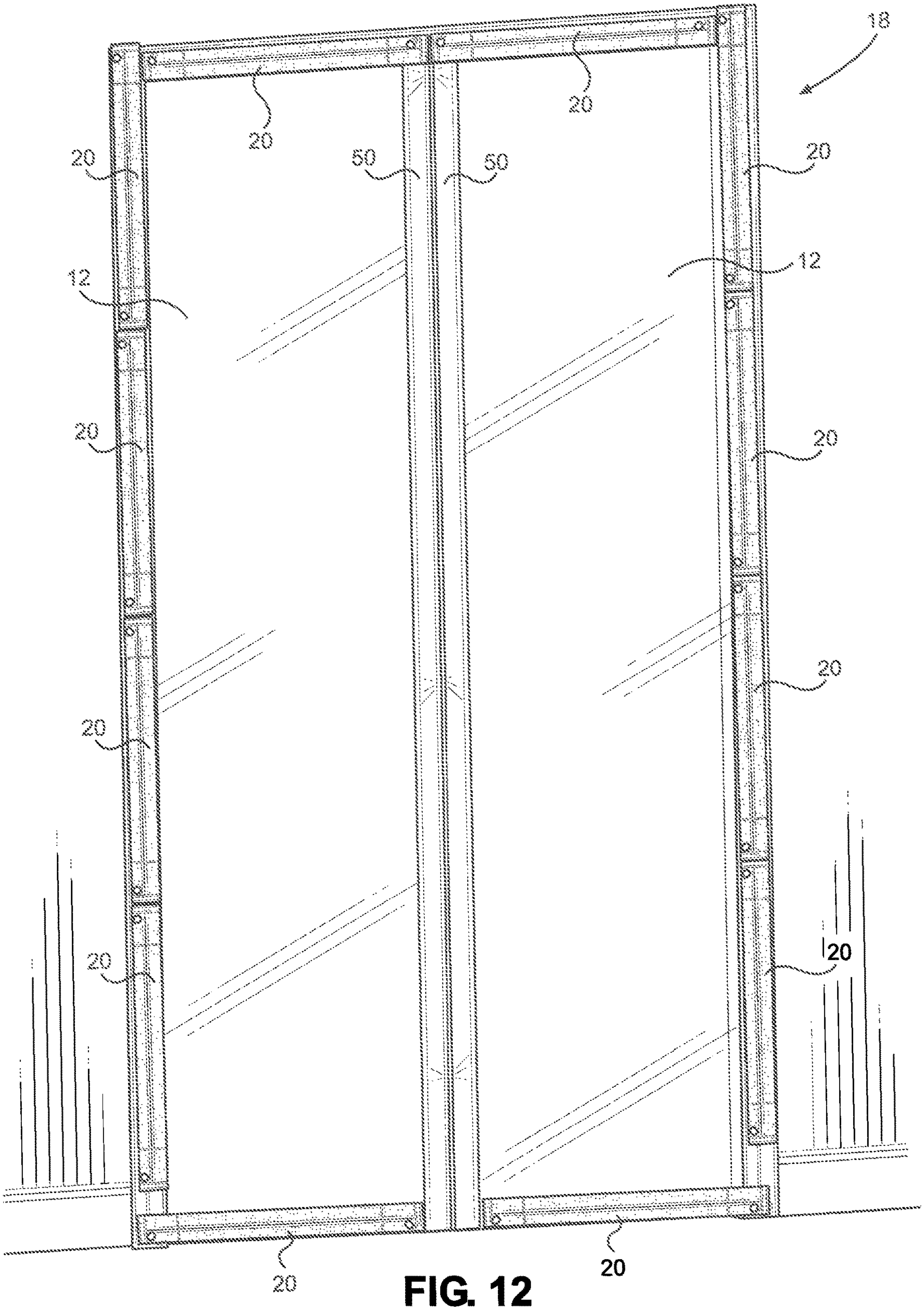
FIG. 12 is a perspective view of a temporary door formed by a plurality of closure members of a segmented closure system in accordance with an example embodiment.

FIG. 12 illustrates the usage of closure members 20 being utilized to form the outer perimeter of a temporary barrier without a magnetic threshold, with connector strips 50 being used on the edges of the sheets 12 which face each other.

Figure 13A:
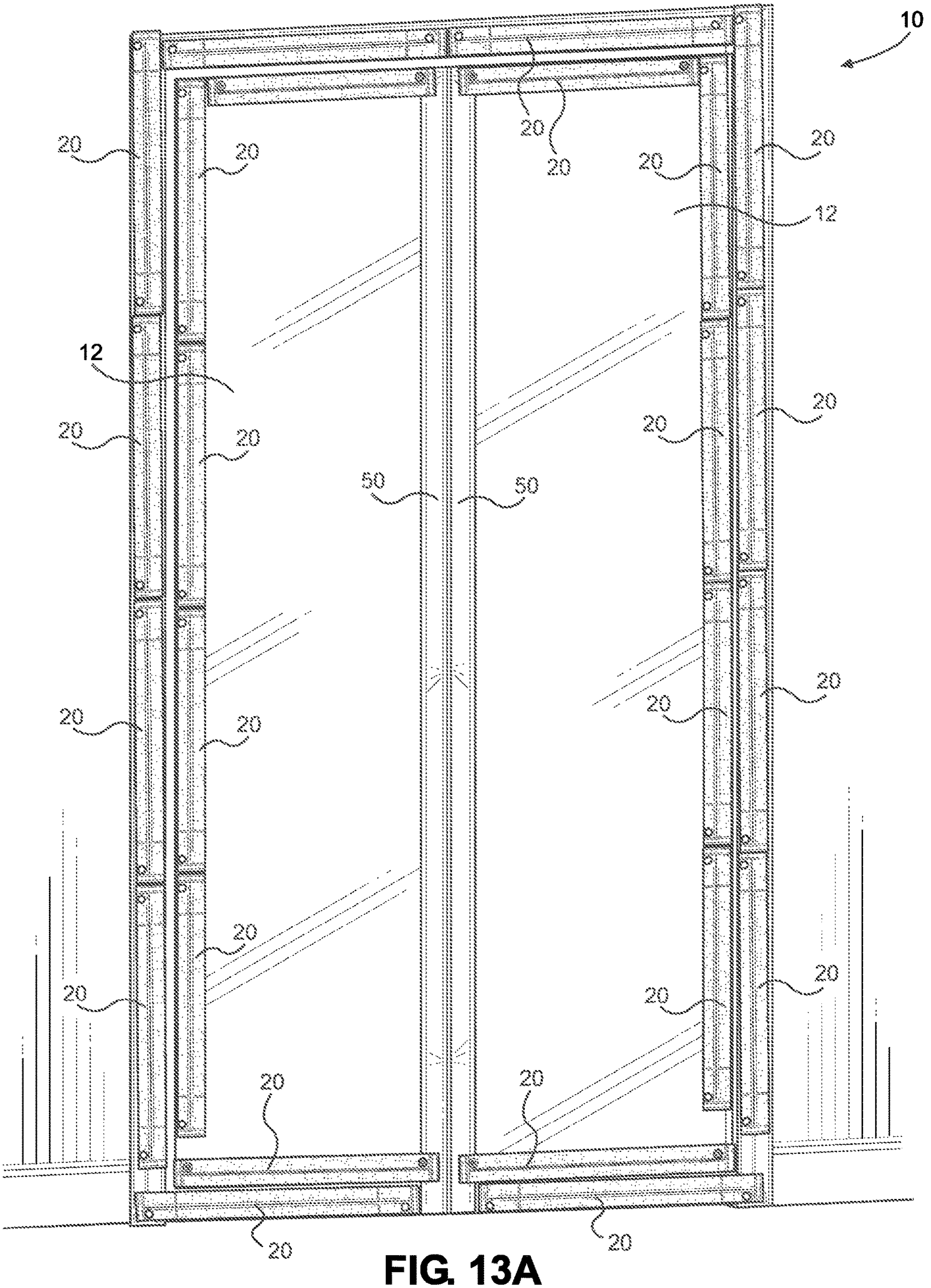
FIG. 13A is a perspective view of a temporary nested door formed by a plurality of closure members of a segmented closure system in accordance with an example embodiment.
Figure 13B:
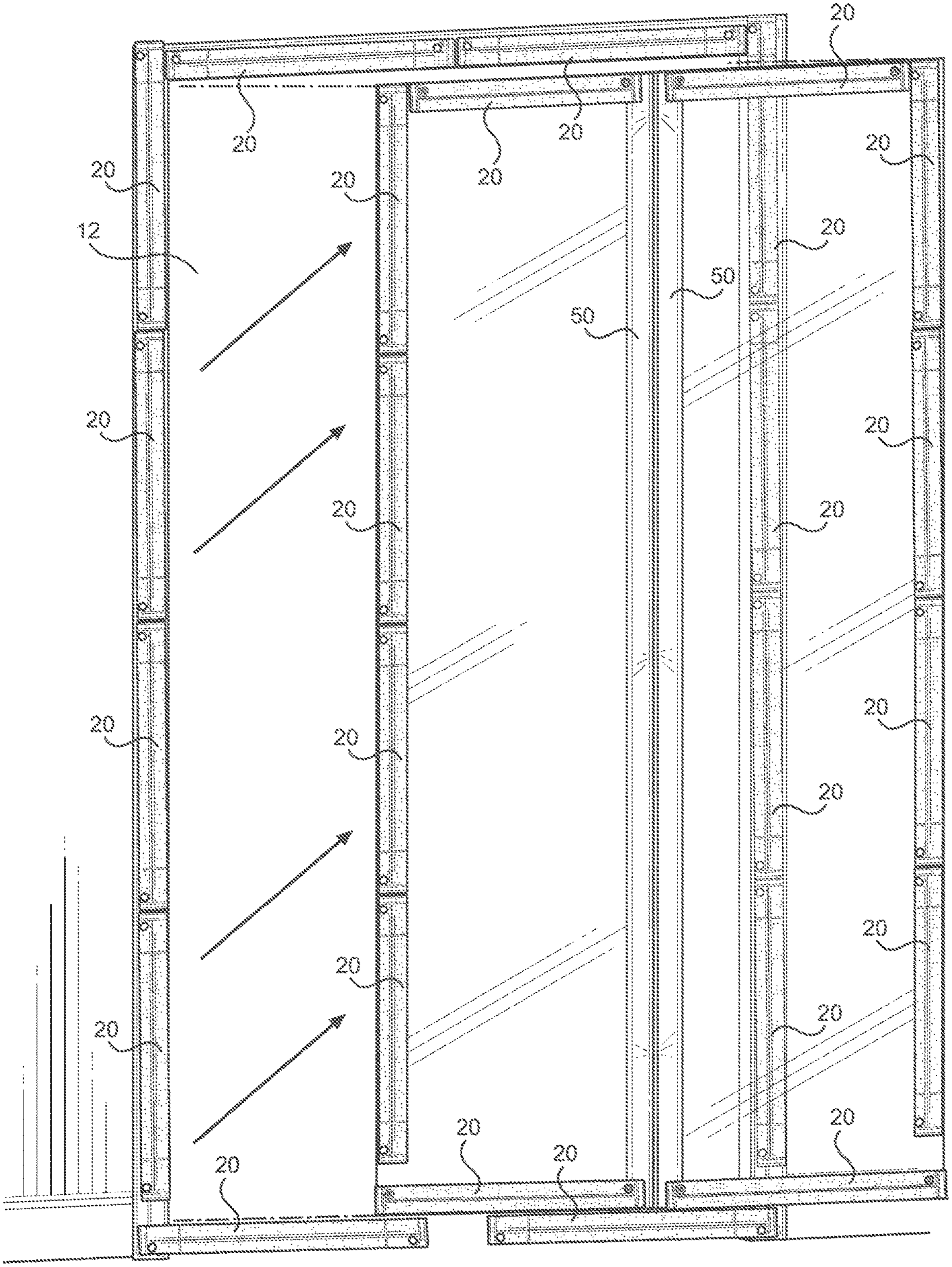
FIG. 13B is a perspective view of a temporary nested door with the interior door being removed of a segmented closure system in accordance with an example embodiment.

As shown in FIGS. 13A and 13B, a nested barrier may be constructed with the use of closure members 20 and/or connector strips 50 whereby an interior, nested door may be removed from an outer frame formed of closure members 20. This configuration may be desirable so that a barrier may be easily moved between locations without having to reconnect each of the closure members 20. As shown in FIG. 13A, an outer perimeter of closure members 20 may be secured to a structure surrounding the opening. An inner perimeter of closure members 20 may be magnetically engaged with the outer perimeter of closure members 20, with the inner perimeter of closure members 20 being connect around a pair of adjacent sheets 12. Connector strips 50 (or closure members 20) may be secured to the adjacent edges of the sheets 12 so that the sheets 12 may be opened.

When desired, the inner perimeter of closure members 20 may simply be pulled out of the outer perimeter of closure members 20 to remove the inner, nested door as shown in FIG. 13B. The inner, nested door may then be moved and re-secured to another outer perimeter of closure members 20 surrounding a different opening in a nearby location.

Figure 13C:
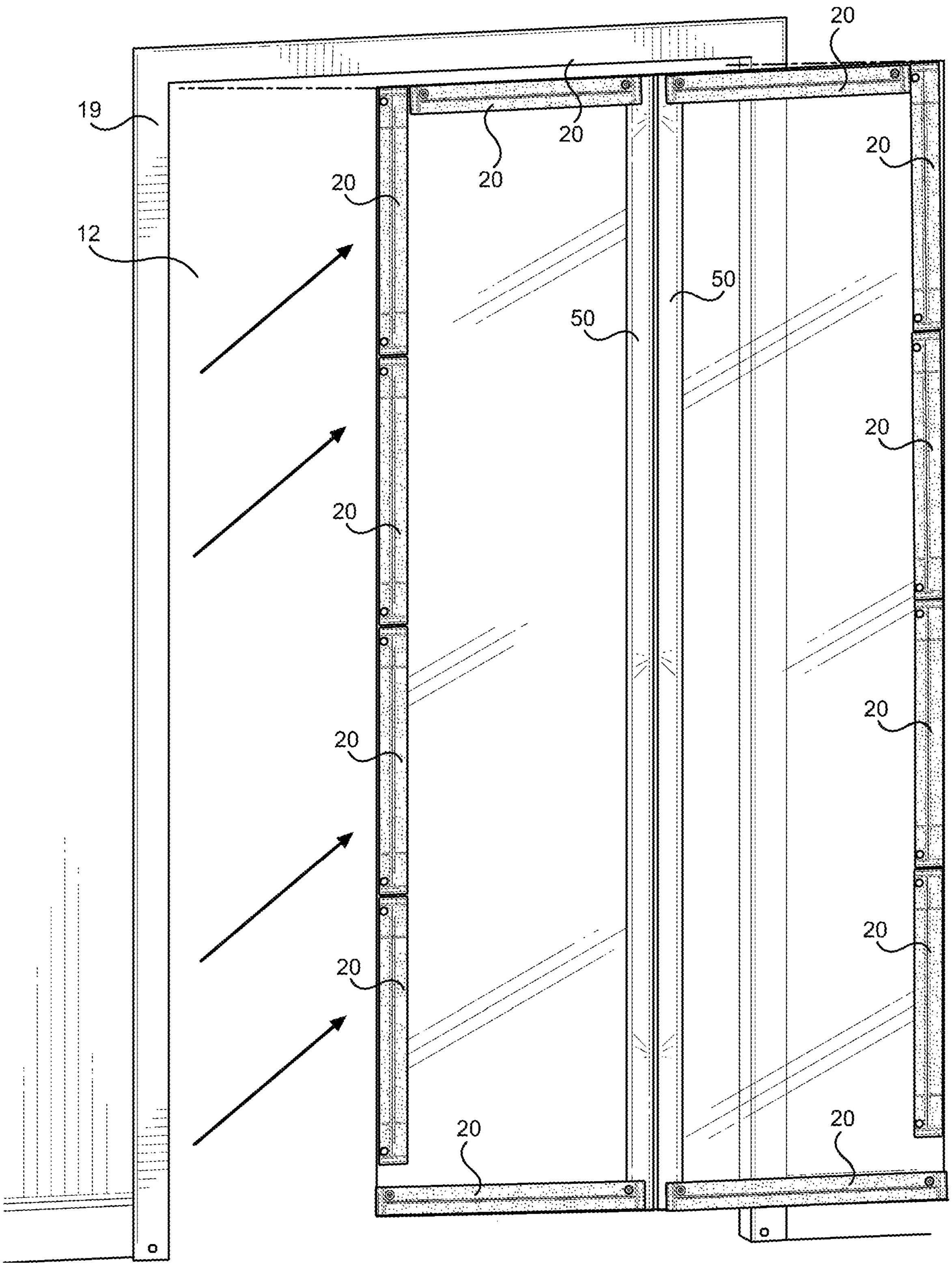
FIG. 13C is a perspective view of a nested door connected to a steel-framed door of a segmented closure system in accordance with an example embodiment.

FIG. 13C illustrates the usage of closure members 20 to form a nested, temporary barrier 18 (e.g., door) that may be easily and removable secured to a metallic door frame 19, such as a steel door frame 19. In such an embodiment, the closure members 20 may be secured around the edges of a barrier-forming material such as one or more plastic sheets 12 to form the nested barrier. The formed barrier may then be secured easily to a metallic door frame 19, with the magnets 30 of the respective closure members 20 being magnetically engaged with the metallic door frame 19. The barrier may then be retrieved by pulling on the barrier to disengage the magnets 30, thus allowing the entire barrier to be easily stored for future usage, or transferred to another metallic door frame 19 for further use.

It should also be appreciated that various other configurations may be utilized with a metallic door frame 19 to form various types of barriers 18. As one example, a closure member 20 may include a full magnetic backing. Such an embodiment of a closure member 20 would be similar to that shown in FIG. 17B except, instead of fastener 32 covering an entire face of the closure member 20, a magnet 30 or a plurality of magnets 30 may be arranged to cover an entire face (or both entire faces) of the closure member 20. Thus, in such an embodiment, the inner and/or outer surfaces 25, 26 of the closure member 20 may be substantially covered by one or more magnets 30.

In such an embodiment, the closure member 20 may be utilized to secure a plastic sheet 12 directly to the door frame 19 to form a barrier 18. The plastic sheet 12 may be secured around the door frame 19 and secured thereto by one or more closure members 20, with the magnet-covered inner surface 26 of the closure member 20 engaging with the door frame 19 and the plastic sheet 12 being sandwiched between the closure member 20 and the door frame 19. In such embodiments, the upper and/or lower ends 21, 22 of one or more of the closure members 20 may be miter cut (i.e., cut at an angle such as diagonally) such that the closure members 20 fit perfectly around the door frame 19 without overlapping each other.

Figure 20:
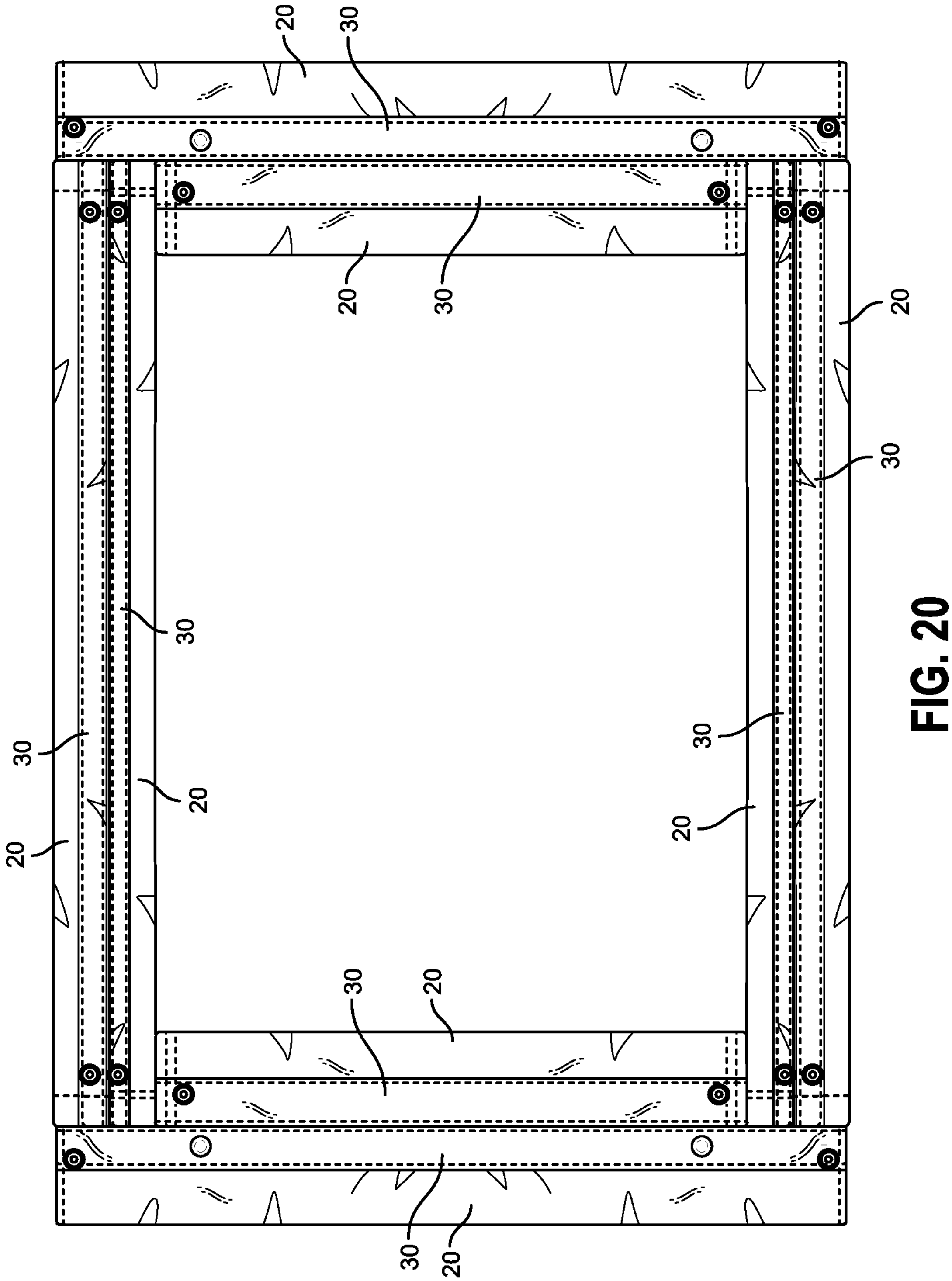
FIG. 20 is a frontal view of a window formed by a plurality of closure members in accordance with an example embodiment.

FIG. 20 illustrates an example embodiment of a nested window which may be formed from a plurality of closure members 20. Such a nested window may be positioned internally to a plastic sheet 12 so as to allow for ventilation or for passing objects through the plastic sheet 12 without otherwise opening it. As can be seen, an outer layer and an inner layer of closure members 20 may be formed, with their magnets 30 facing internally towards each other to construct the nested window configuration.

It should also be appreciated that a plastic sheet 12 may be sandwiched between a pair of closure members 30, with the closure members 30 being magnetically attracted to each other such that the plastic sheet 12 is secured between the closure members 30. In such an embodiment, a first closure member 30 may be positioned on a rear side of the plastic sheet 12 and a second closure member 30 may be secured on a front side of the plastic sheet 12 directly opposite the first closure member 30. The magnets 30 of the respective closure members 20 will engage with each other to secure the plastic sheet 12 between the closure members 20. In this manner, the closure members 20 may be secured directly to the plastic sheet 12 without the need for a backing strip, fastener, adhesive, or the like.

In embodiments in which a doorway is to be formed from a plastic sheet 12, four closure members 20 may be utilized, with a first pair of closure members 20 connected to a first edge of the plastic sheet 12 and a second pair of closure members 20 connected to a second edge of the plastic sheet 12 such that the first pair of closure members 20 may be removably secured to the second pair of closure members 20 to selectively close the doorway.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A segmented closure system, comprising:

a first closure member removably secured to a first side of a barrier, wherein the first closure member is comprised of an elongated strip, wherein the first closure member includes a first magnetic strip positioned along substantially an entire length of a first side edge of the first closure member, wherein the first closure member includes a first fastener for removably securing the first closure member to the barrier, and wherein the first closure member includes a first mating connector;

a second closure member removably secured to a lower edge of the barrier at a right angle with respect to the first closure member, wherein the second closure member is comprised of an elongated strip, wherein the second closure member includes a second magnetic strip positioned along substantially an entire length of a second side edge of the second closure member, wherein the second closure member includes a second fastener for removably securing the second closure member to the barrier, and wherein the second closure member includes a second mating connector;

wherein the first mating connector is engaged with the second mating connector; and a magnetic threshold attached on top of a ground surface underlying the barrier, wherein the second magnetic strip is adapted to magnetically engage with the magnetic threshold so as to removably secure the second closure member to the magnetic threshold;

a third closure member removably secured to an upper edge of the barrier at a right angle with respect to the first closure member, wherein the third closure member is comprised of an elongated strip, wherein the third closure member includes a third magnetic strip positioned along substantially an entire length of a third side edge of the third closure member, wherein the third closure member includes a third fastener for removably securing the third closure member to the barrier; and a metallic door frame, wherein the metallic door frame includes an upper end, and wherein the upper end of the metallic door frame comprises a horizontally-oriented metallic frame member; and, wherein the third magnetic strip is adapted to magnetically engage with the horizontally-oriented metallic frame member so as to removably secure an upper end of the barrier to the metallic door frame.

2. The segmented closure system of claim 1, wherein the first magnetic strip extends between an upper end and a lower end of the first closure member.

3. The segmented closure system of claim 1, wherein the barrier is comprised of a rectangular sheet.

4. The segmented closure system of claim 1, wherein the first fastener and the second fastener are each comprised of a strip.

5. The segmented closure system of claim 1, wherein the first fastener and the second fastener are each comprised of an adhesive.

6. The segmented closure system of claim 1, wherein the first mating connector is comprised of a male snap fastener and wherein the second mating connector is comprised of a female snap fastener.

7. The segmented closure system of claim 1, further comprising a clamp connected to the first closure member.

8. The segmented closure system of claim 1, wherein a first side of the first mating connector is comprised of a male configuration and wherein a second side of the first mating connector is comprised of a female configuration.

9. The segmented closure system of claim 8, wherein a first side of the second mating connector is comprised of a male configuration and wherein a second side of the second mating connector is comprised of a female configuration.

10. A segmented closure system, comprising:

a first closure member removably secured to a first side of a barrier, wherein the first closure member includes a first magnet positioned along substantially an entire length of a first side edge or a second side edge of the first closure member, wherein the first closure member includes a first fastener for removably securing the first closure member to the barrier, and wherein the first closure member includes a first snap fastener; and a second closure member removably secured to a lower end of the barrier, wherein the second closure member includes a second magnet positioned along substantially an entire length of a first side edge or a second side edge of the second closure member, wherein the second closure member includes a second fastener for removably securing the second closure member to the barrier, and wherein the second closure member includes a second snap fastener;

a third closure member removably secured to a second side of the barrier, wherein the third closure member includes a third magnet positioned along substantially an entire length of a first side edge or a second side edge of the third closure member, and wherein the third closure member includes a third fastener for removably securing the third closure member to the barrier;

a fourth closure member removably secured to an upper end of the barrier, wherein the fourth closure member includes a fourth magnet positioned along substantially an entire length of a first side edge or a second side edge of the fourth closure member, and wherein the fourth closure member includes a fourth fastener for removably securing the fourth closure member to the barrier;

wherein the first snap fastener of the first closure member is adapted to removably engage with the second snap fastener of the second closure member so as to removably connect the first closure member at a right angle with respect to the second closure member; and a metallic door frame, wherein a first side of the metallic door frame comprises a first vertically-oriented metallic frame member, wherein a second side of the metallic door frame comprises a second vertically-oriented metallic frame member, and wherein an upper end of the metallic door frame comprises a horizontally-oriented metallic frame member extending between an upper end of the first vertically-oriented metallic frame member and an upper end of the second vertically-oriented metallic frame member;

wherein the third magnet is adapted to magnetically engage with the first vertically-oriented metallic frame member so as to removably secure the third closure member to the first vertically-oriented metallic frame member; and, wherein the fourth magnet is adapted to magnetically engage with the horizontally-oriented metallic frame member so as to removably secure the fourth closure member to the horizontally-oriented metallic frame member.

11. The segmented closure system of claim 10, wherein the first closure member is oriented vertically along a vertical edge of the barrier.

12. The segmented closure system of claim 10, wherein the second closure member is oriented horizontally along a horizontal edge of the barrier.

13. The segmented closure system of claim 10, further comprising a linkage member adapted to be connected between an upper end of the first closure member and an upper end of the second closure member.

* * * * *